United States Patent
Hou et al.

(10) Patent No.: US 9,693,250 B1
(45) Date of Patent: Jun. 27, 2017

(54) SYSTEMS AND METHODS FOR MONITORING ELECTROMAGNETIC COMPATIBILITY

(71) Applicant: VIASAT, INC., Carlsbad, CA (US)

(72) Inventors: Jason Hou, Carlsbad, CA (US); Michael Kretsch, San Diego, CA (US); Conrad C. Grell, Carlsbad, CA (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 15/211,869

(22) Filed: Jul. 15, 2016

Related U.S. Application Data

(60) Provisional application No. 62/193,214, filed on Jul. 16, 2015.

(51) Int. Cl.
| | |
|---|---|
| *H04L 27/34* | (2006.01) |
| *H04W 24/08* | (2009.01) |
| *H04B 7/26* | (2006.01) |
| *H04B 1/713* | (2011.01) |
| *H04B 1/18* | (2006.01) |

(52) U.S. Cl.
CPC .............. *H04W 24/08* (2013.01); *H04B 1/18* (2013.01); *H04B 1/713* (2013.01); *H04B 7/2643* (2013.01); *H04L 27/34* (2013.01)

(58) Field of Classification Search
CPC ....... H04W 24/08; H04B 7/2643; H04B 1/18; H04B 1/713; H04L 27/34
See application file for complete search history.

(56) References Cited

U.S. PATENT DOCUMENTS

| | | | |
|---|---|---|---|
| 6,704,349 B1 | 3/2004 | Masenten | |
| 7,239,658 B1 * | 7/2007 | Zuber | H04B 1/713 375/136 |
| 7,340,234 B2 | 3/2008 | Jun et al. | |
| 7,546,089 B2 | 6/2009 | Bellantoni | |
| 7,548,737 B2 | 6/2009 | Domino et al. | |
| 7,818,028 B2 | 10/2010 | Vassiliou et al. | |
| 8,456,283 B2 | 6/2013 | Brauner et al. | |
| 8,976,837 B1 * | 3/2015 | Lomp | H04B 1/71632 375/130 |
| 9,094,114 B1 * | 7/2015 | Hou | H04L 12/6418 |
| 9,154,179 B2 | 10/2015 | Gudem et al. | |

(Continued)

OTHER PUBLICATIONS

Meaamar: "An Ultra-Wideband Receiver Front-end", thesis submitted to The Nanyang Technological University, 2010, 127 pages.

(Continued)

*Primary Examiner* — Kenneth Lam
(74) *Attorney, Agent, or Firm* — Fountainhead Law Group P.C.

(57) ABSTRACT

Disclosed is a Link 16 terminal having a receiver and a transmitter. The receiver may be configured to process received signals in a receive mode to produce digitized samples, which may then be processed in a digital signal processor. The transmitter may be configured to produce a transmit signal that is provided to an antennas for transmission during transmit mode. The transmit signal may also be provided to the receiver in transmit mode to produce digitized samples of the transmit mode, may then be processed in a digital signal processor for compliance with requirements for Link 16 transmissions.

20 Claims, 22 Drawing Sheets

(56) References Cited

U.S. PATENT DOCUMENTS

| | | | |
|---|---|---|---|
| 2003/0158963 A1* | 8/2003 | Sturdy | H04L 12/6418 709/238 |
| 2013/0089130 A1 | 4/2013 | Shen et al. | |
| 2014/0018011 A1 | 1/2014 | Chen et al. | |
| 2014/0038541 A1* | 2/2014 | Reiss | H04K 3/22 455/296 |
| 2015/0042412 A1 | 2/2015 | Imbornone et al. | |

OTHER PUBLICATIONS

Korpi et al.: "Full-Duplex Mobile device—Pushing the Limits", May 16, 2016, 18 pages.

"Link 16 Electromagnetic Compatibility (EMC) Features Certification Process and Requirements", DoD 4650.1-R1, Apr. 26, 2005, 115 pages.

\* cited by examiner

SYSTEMS AND METHODS FOR MONITORING ELECTROMAGNETIC COMPATIBILITY

CROSS REFERENCE TO RELATED APPLICATIONS BITSTREAM

Pursuant to 35 U.S.C. §119(e), this application is entitled to and claims the benefit of the filing date of U.S. Provisional App. No. 62/193,214 filed Jul. 16, 2015, the content of which is incorporated herein by reference in its entirety for all purposes.

BACKGROUND

Link 16 is a frequency-hopping, jam-resistant, high-capacity data link used by the military. Link 16 terminals operate on the principle of Time Division Multiple Access (TDMA) and use the 960-1215 MHz band in a frequency hopping mode. To prevent the radio frequency (RF) transmissions of Link 16 terminals from interfering with the normal operations of other (e.g., civilian) systems, various characteristics of the transmissions are monitored. For example, the pulse power spectrum and out of band emission characteristics are strictly specified.

The requirements for conformance with Link 16 transmissions are disclosed in a document entitled "Link 16 Electromagnetic Compatibility (EMC) Features Certification Process and Requirements," Apr. 26, 2005, Assistant Secretary of Defense, which is incorporated herein by reference in its entirety for all purposes. The document describes functionality, referred to as the EMC Features monitors (or monitoring functions), to ensure that a Link 16 terminal complies with the appropriate requirements for spread spectrum Link 16 transmissions in the 960-1215 MHz band.

SUMMARY

In accordance with aspects of the present disclosure, a method of operating a Link 16 terminal may include operating the Link 16 terminal in a receive mode. Receive mode operation may include receiving a receive signal at an antenna. Direct conversion may be performed in a direct conversion receiver on the receive signal to produce a first signal. First processing may be performed on the first signal, including synchronizing a timing in the Link 16 terminal to the receive signal. Transmit mode operation may include generating a transmit signal. The transmit signal may be provided to the antenna for transmission. Operation of the Link 16 terminal in transmit mode may be monitored for compliance with requirements for Link 16 transmissions, and may include coupling to the transmit signal to produce a coupled transmit signal. The coupled transmit signal may be provided to the direct conversion receiver circuit. Direct conversion of the coupled transmit signal may be performed in the direct conversion receiver circuit to produce a second signal. Second processing may be performed on the second signal to determine compliance of the transmit signal with at least some of the requirements for Link 16 transmissions.

In accordance with aspects of the present disclosure, a Link 16 terminal device may include a direct conversion transmitter circuit having an output for a transmit signal. A coupler may be coupled to the output of the direct conversion transmitter circuit. A first switch having a first terminal may be coupled to a coupled port of the coupler. A direct conversion receiver circuit may be coupled to the common terminal of the first switch. A second switch having a first terminal may be coupled to the coupler, and a second terminal may be coupled to a second terminal of the first switch. An antenna may be coupled to a common terminal of the second switch. A signal processor may be coupled to the output of the direct conversion receiver circuit and configured to process a signal provided to the direct conversion receiver circuit. The signal processor may have a first output for Link 16 messages and a second output for fault codes representative of non-compliance of the Link 16 terminal device with one or more requirements for Link 16 transmissions. A controller may be configured to set the first switch and the second switch in a first switched configuration when operating the Link 16 terminal device in a receive mode and to set the first switch and the second switch in a second switched configuration when operating the Link 16 terminal device in a transmit mode. The first switched configuration may establish a signal path, comprising the first switch and the second switch, between the antenna and the direct conversion receiver circuit to provide a signal received by the antenna to the direct conversion receiver circuit. The second switched configuration may establish a signal path, comprising the coupler and the first switch, between the direct conversion transmitter circuit and the antenna to provide the transmit signal to the antenna for transmission. The second switched configuration may further establish a signal path, comprising the coupler and the second switch, between the direct conversion transmitter circuit and the direct conversion receiver circuit to provide a signal that is coupled to the transmit signal by the coupler to the direct conversion receiver circuit.

The following detailed description and accompanying drawings provide further understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be understood that when an element is referred to as being "connected to" or "coupled to" another element, the element can be directly electrically connected to or coupled to the other element in some embodiments, and in other embodiments, the electrical connection between one element and another element may include intervening elements. It will be evident, to one skilled in the art that the present disclosure as expressed in the claims may include some or all of the features in these examples, alone or in combination with other features described below, and may further include modifications and equivalents of the features and concepts described herein.

Figure 1:
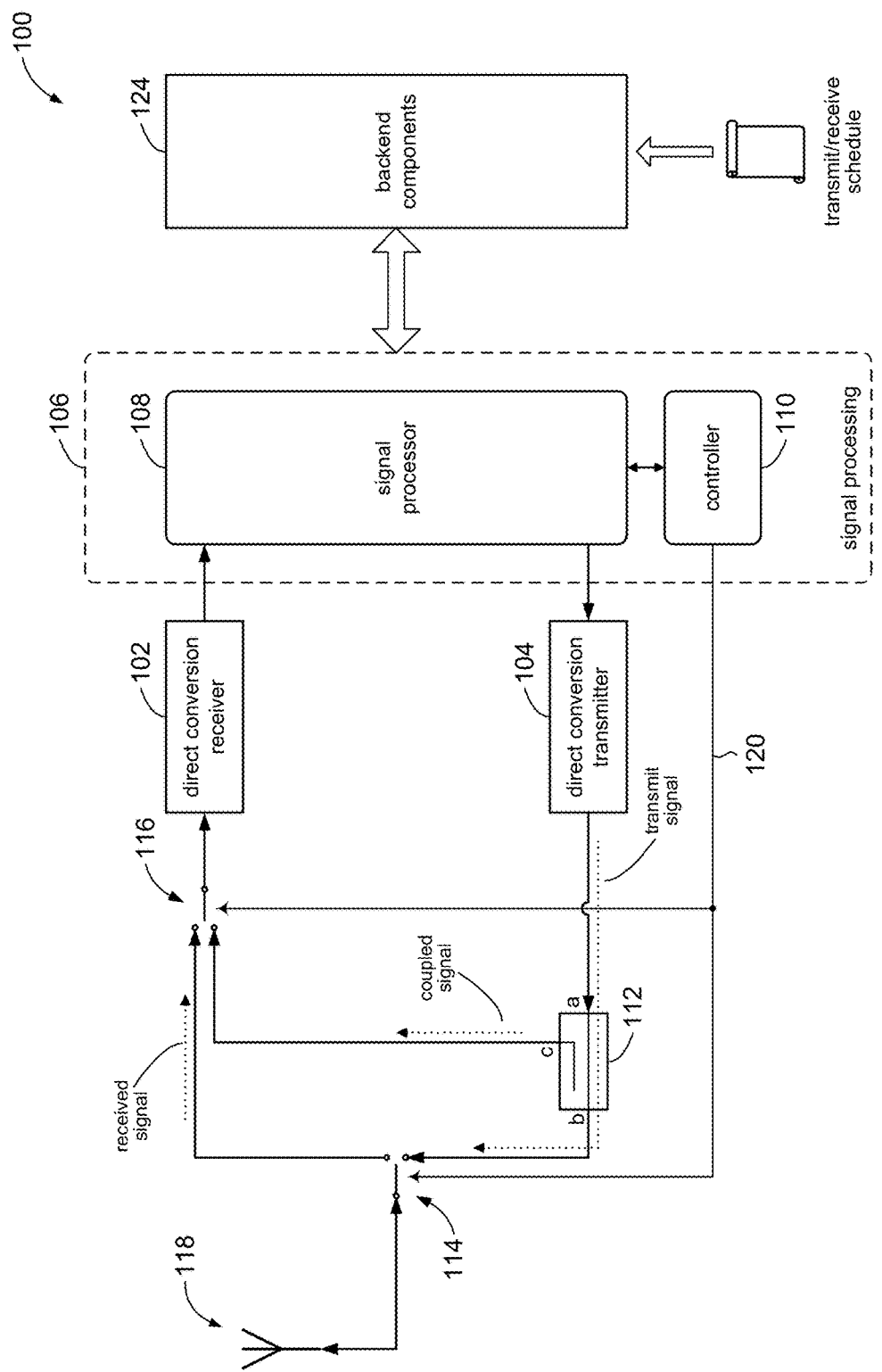
FIG. 1 shows a high level block diagram of circuitry in a Link 16 terminal in accordance with the present disclosure.
Figure 1A:
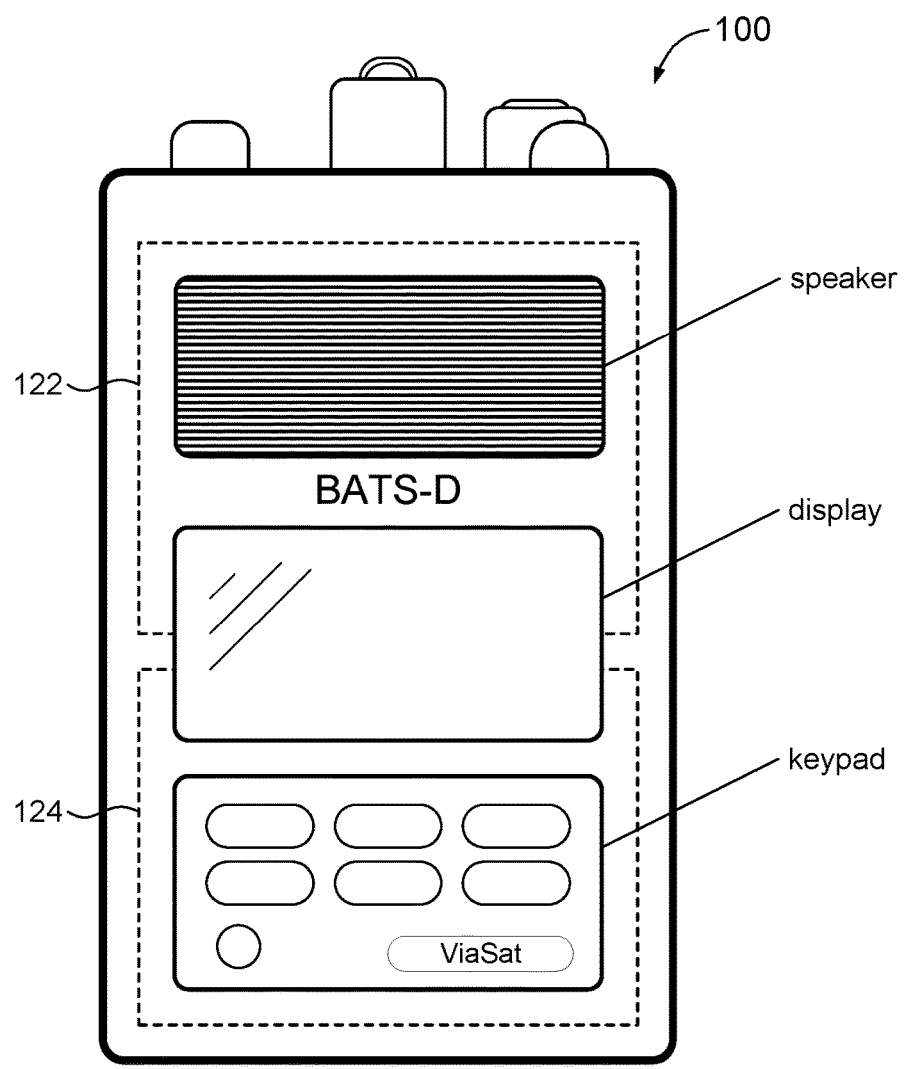
FIG. 1A illustrates the handheld form factor of a Link 16 terminal in accordance with the present disclosure.

Referring to FIGS. 1 and 1A, a Link 16 terminal device 100 in accordance with various embodiments of the present disclosure may be provided in a handheld form factor. The example shown in FIG. 1A is the Battlefield Awareness & Targeting System-Dismounted™ (BATS-D™) radio, developed, manufactured, and sold by the assignee of the present disclosure. The BATS-D™ radio is a Link 16 device that can be vest-worn or handheld by the user, and is capable of Link 16 network access to Special Operations forces, Expeditionary forces, Joint Terminal Attack Controllers (JTACs), ground vehicles, maritime craft, Unmanned Aerial Vehicles (UAVs), and so on.

In accordance with some embodiments, the device 100 (FIG. 1) may comprise front-end circuitry 122 and backend components 124. The front-end circuitry 122 may include a direct conversion receiver 102 and a direct conversion transmitter 104 to convey information to other Link 16 terminals (not shown) in specially formatted messages referred to as Link 16 messages. The direct conversion receiver 102 and direct conversion transmitter 104 may be connected to digital signal processing logic 106.

In accordance with the present disclosure, the front-end circuitry 122 may include an RF coupler 112 and a single-pole double-throw (SPDT) type switch 114. The coupler 112 may have an input port a connected to an output of the direct conversion transmitter 104. An output port b of the coupler 112 may be connected to one terminal of the switch 114. One or more antennas 118 may be connected to a common terminal of switch 114. Further in accordance with the present disclosure, the front-end circuitry 122 may include an SPDT switch 116 having a common terminal coupled to an input of the direct conversion receiver 102. Another terminal of switch 114 may be connected to one terminal of switch 116. An output port C of the coupler 112 may be connected to another terminal of switch 116. The controller 110 may provide switch control signals 120 to operate the switches 114, 116.

The signal processing logic 106 may include a signal processor 108 and a controller 110. The signal processor 108 may perform digital signal processing on signals received by the direct conversion receiver 102 and provided to the signal processing logic 106 in the form of digitized samples to retrieve Link 16 messages contained in the received signal. The signal processor 108 may provide Link 16 messages to the direct conversion transmitter 104 for transmission to receiving devices (not shown); for example, other Link 16 terminals.

The device 100 may include various backend components 124 to support operation of the device 100, including but not limited to components such as a power supply, memory and storage (e.g., RAM, flash memory, etc.), a crystal oscillator for various clock sources, test ports, and so on. The backend components 124 may include input components (e.g., keypad, FIG. 1A) and output components (display, speaker, etc.) to support interactions with a user.

Figure 2:
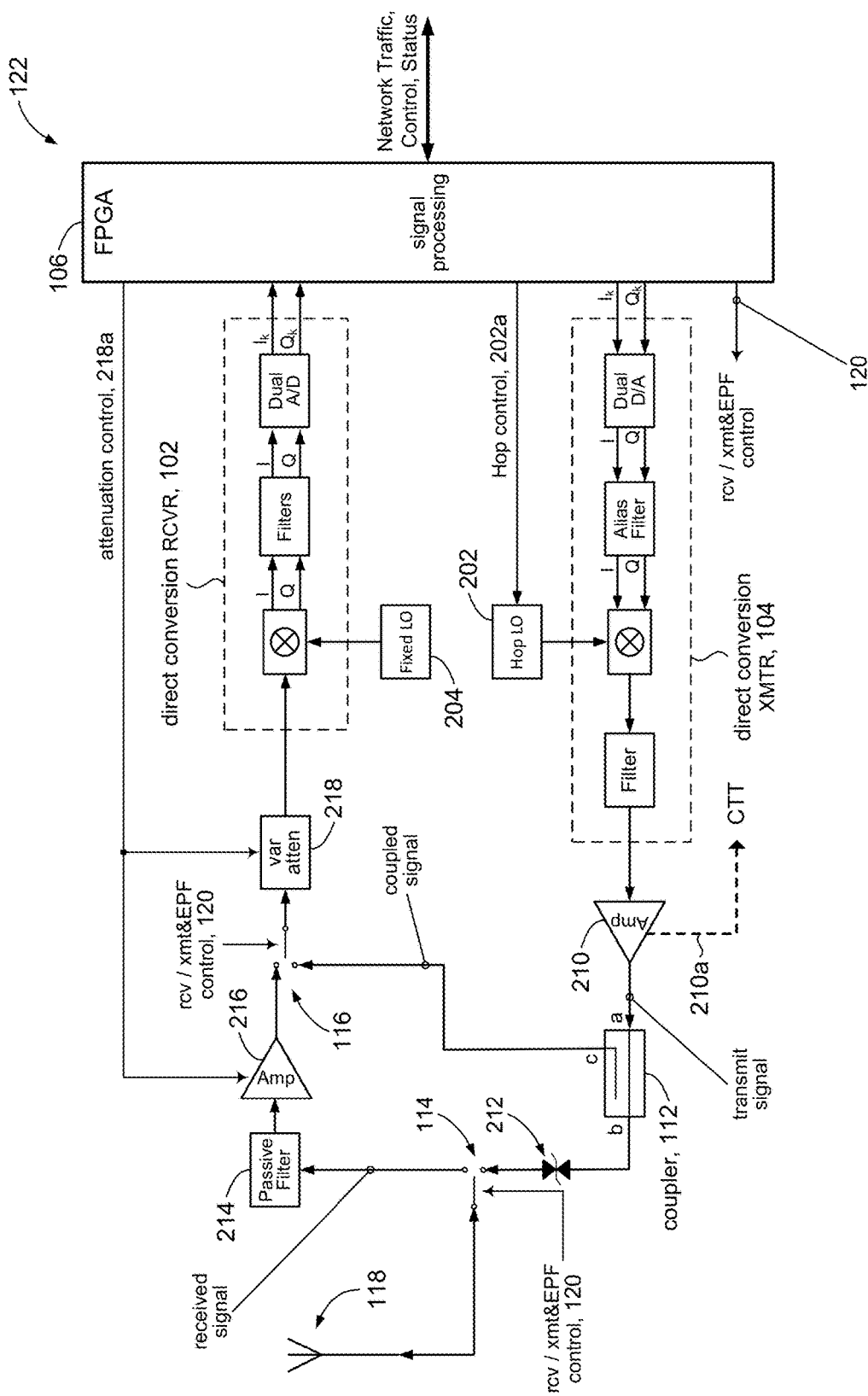
FIG. 2 shows additional circuitry in a Link 16 terminal in accordance with the present disclosure.

FIG. 2 shows details of an illustrative embodiment of the front-end circuitry 122 in accordance with various embodiments of the present disclosure. In some embodiments, for example, the signal processing logic 106 may comprise a field programmable gate array (FPGA), a digital signal processor (DSP), and in general any suitable digital processing component. In a particular implementation, for example, the signal processing logic 106 may use the Kintex 7™ FPGA from Xilinx, Inc., configured with the Xilinx® Microblaze™ soft processor. The signal processing logic 106 may be configured to provide or otherwise support functionality provided by signal processor 106 (FIG. 1) and controller 110.

In some embodiments, the direct conversion receiver 102 may comprise a mixer, a filter block, and an analog to digital conversion (ADC) block; additional details are described below. The direct conversion receiver 102 may generate digitized in-phase ($I_K$) samples and quadrature-phase ($Q_K$) samples (bitstreams, signals, etc.) that can be provided to the signal processing logic 106. In accordance with the present disclosure, a fixed local oscillator (LO) 204 may provide a fixed frequency output to the direct conversion receiver 104 to generate a heterodyned receive signal by mixing the output of the fixed LO 204 with the signal received by the antenna 118. In accordance with the present disclosure, the heterodyned receive signal may be digitized and digitally processed by the signal processing logic 106 to retrieve Link 16 messages contained in the signal received by the antenna 118.

In some embodiments, the direct conversion transmitter 104 may comprise a digital to analog conversion (DAC) block, an anti-alias filter block, a mixer, and an output filter block; additional details are described below. The signal processing logic 106 may provide $I_K$ and $Q_K$ bitstreams that represent Link 16 messages to be transmitted to the direct conversion transmitter 104. As noted above, Link 16 messaging is based on TDMA. Further in accordance with Link 16 messaging, the carrier frequency within each time slot may be varied among 51 predetermined carrier frequencies using a method referred to as frequency hopping. Accordingly, the front-end circuitry 122 may include a frequency hopped local oscillator (LO) 202 to produce a hopped carrier signal that can be provided to the direct conversion transmitter 104. The signal processing logic 106 may generate a hop control signal 202a that controls the frequency hopped LO 202 to hop the carrier frequency in accordance with a predetermined frequency hopping pattern.

The front-end circuitry 122 may include an RF output power amplifier 210. The amplifier 210 may be connected to the direct conversion transmitter 104 to amplify the transmit signal produced by the direct conversion transmitter 104 to a level sufficient to drive the antenna 118. An output of amplifier 210 may be connected to the input a of coupler 112. The amplifier 210 may include sensor outputs 210a for "capability to transmit" (CTT) monitoring. This aspect of the present disclosure is described below. The front-end circuitry 122 may include a transient voltage suppression (TVS) diode 212 connected to output b of coupler 112 to protect the circuitry against voltage spikes that may be induced via antenna 118.

The front-end circuitry 122 may include a filter 214 to filter out or otherwise attenuate signals outside the band of interest. For example, filter 214 may be a bandpass filter having cutoff frequencies at 960 MHz and 1215 MHz. The filter 214 may serve as an input filter to eliminate or otherwise attenuate out-of-band signals in signals received by the antenna 118.

A low noise RF amplifier (LNA) 216 may be included to amplify the signal received by the antenna 118. The received signal at the output of antenna 118 can be very small, on the order of microvolts. The LNA 216 can establish a noise floor and boost the received signal to a high enough level that is above the ambient noise of the circuitry comprising the direct conversion receiver 102.

A variable attenuator 218 may be included to maintain the received signal within the dynamic range of the direct conversion receiver 102. In some embodiments, for example, the signal processing logic 106 may produce an attenuation control signal 218a to vary the amount of attenuation in the variable attenuator 218. For example, if the signal processing logic 106 detects that the amplitude of the received signal is too low (e.g., close to the low end of the receiver's dynamic range), the attenuation in the variable attenuator 218 may be reduced. Conversely, if the amplitude is too high, the attenuation control signal 218a may increase the attenuation of variable attenuator 218. In some embodiments, the attenuation control signal 218a may also be provided to the LNA 216. The LNA 216 may be controlled by the attenuation control signal 218a to an ON mode if the received signal is weak. The LNA 216 may be operated in a BYPASS mode for stronger signals. If the received signal is sufficiently strong, the LNA may go into an ATTENUATE mode in order to lower the amplitude to provide some headroom in the direct conversion receiver 102.

Figure 2A:
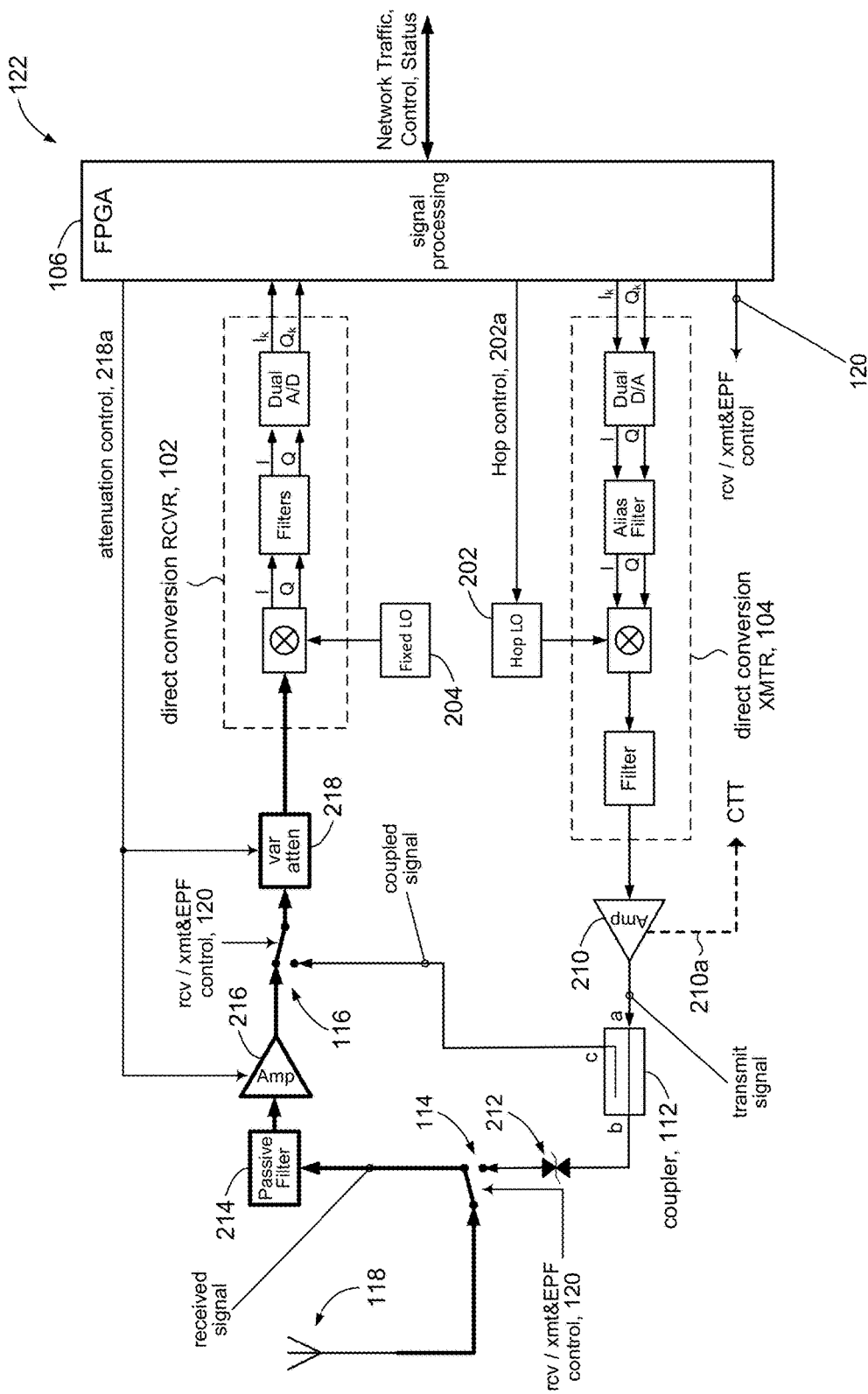
FIGS. 2A and 2B illustrate receive mode and transmit mode configurations, respectively, of the circuitry shown in FIG. 2.

Referring to FIG. 2A, the switches 114, 116 may be operated via switch control signals 120 generated by the signal processing logic 106 to be in a first configuration. This is a receive mode configuration in which the switches 114, 116 provide or otherwise establish a signal path between the antenna 118 and the direct conversion receiver 102, so that signals received by the antenna 118 can be downconverted and sampled in the direct conversion receiver 102, and digitally processed by the signal processing logic 106.

Figure 2B:
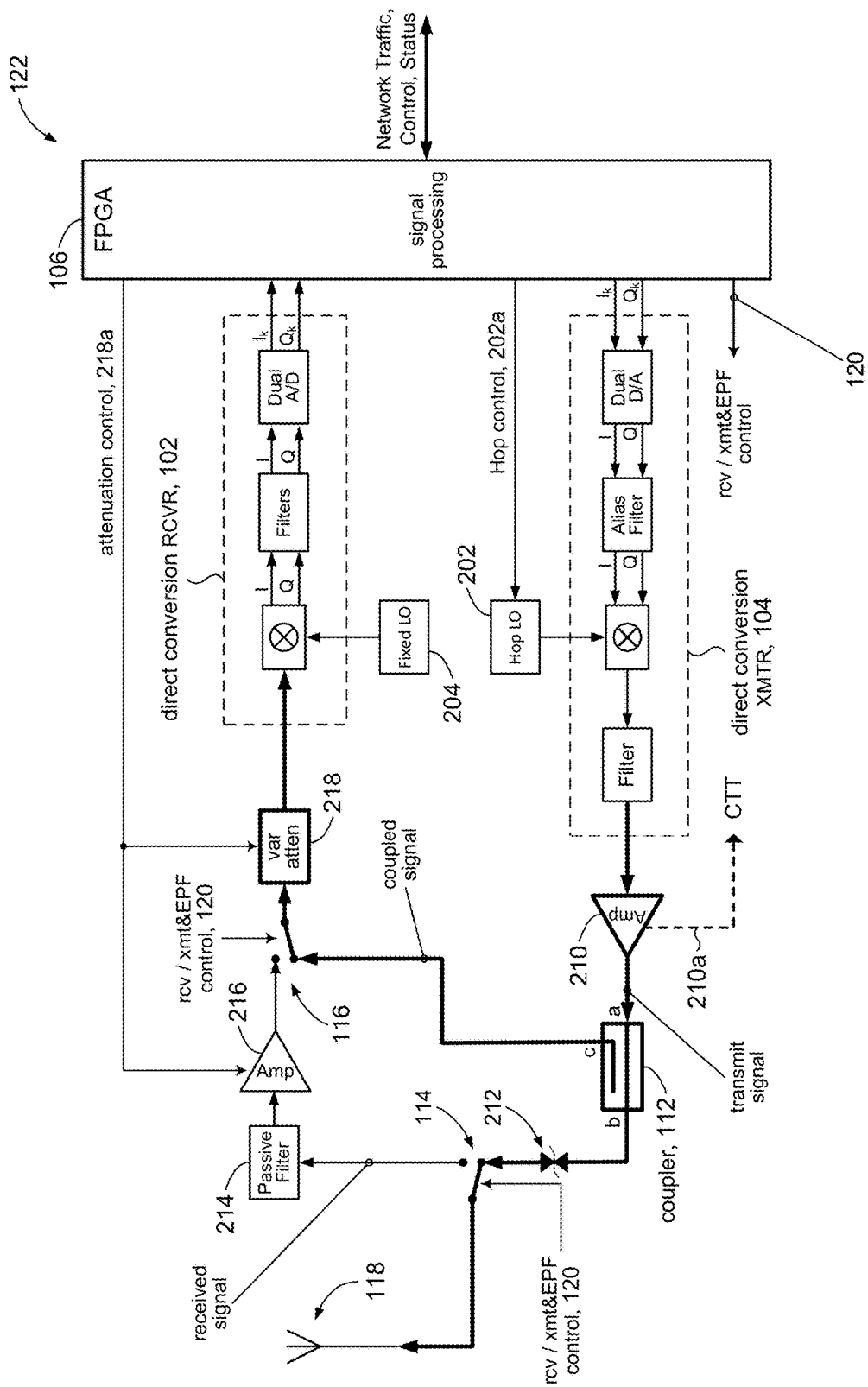

Referring to FIG. 2B, in accordance with the present disclosure, the switches 114, 116 may be operated via switch control signals 120 to be in a second configuration. This is a transmit mode configuration in which the switches 114, 116 provide or otherwise establish a signal path between the direct conversion transmitter 104 and the antenna 118 in order to broadcast a transmit signal produced by the direct conversion transmitter 104.

In accordance with the present disclosure, the second configuration of switches 114, 116 may also establish a signal path between the direct conversion transmitter 104 and the direct conversion receiver 102. As will be described in more detail below, this signal path can provide the transmit signal to the direct transmission receiver 102 and the signal processing logic 106 to perform electromagnetic compatibility (EMC) feature monitoring in accordance with the requirements for Link 16 transmissions. The coupler 112 provides a pick-off point for EMC feature monitoring in accordance with Link 16.

An aspect of the present disclosure is the use of direct conversion techniques in the receiver 102 and transmitter 104. In a direct conversion receiver, the input signal can be converted to baseband in a single frequency conversion. Conversely, in a direct conversion transmitter, the output carrier frequency is equal to a local oscillator (LO) frequency, and modulation and upconversion can occur in a single frequency conversion to produce an output signal. The use of direct conversion allows maximum conservation of RF linearity, allowing ADC and DAC processing to dictate the overall linear dynamic range.

Figure 3A:
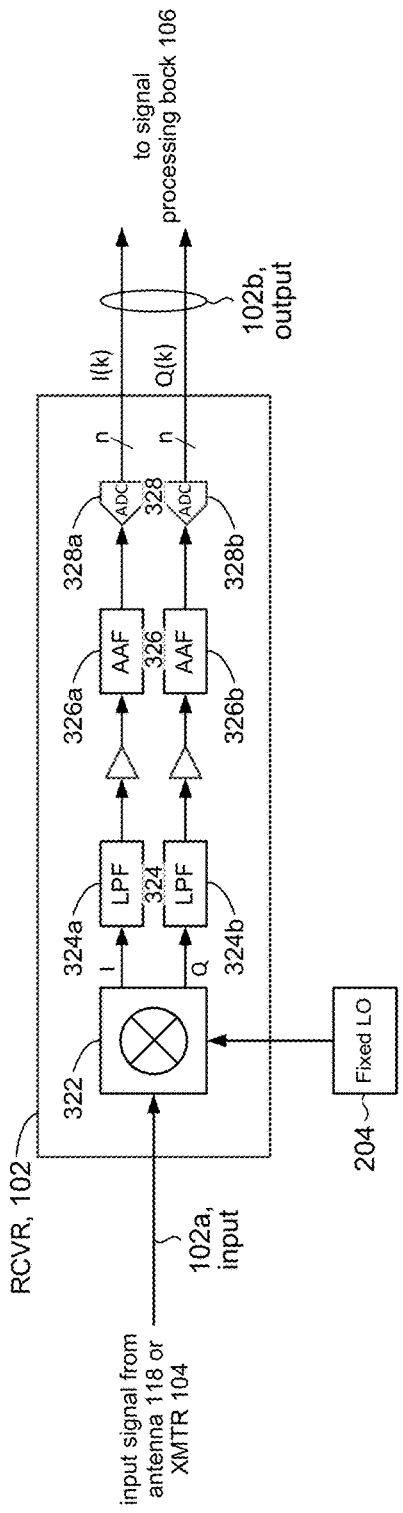
FIGS. 3A and 3B illustrate details of a direct conversion receiver and a direct conversion transmitter, respectively, in accordance with some embodiments of the present disclosure.

Referring now to FIG. 3A, additional details of direct conversion receiver 102 in accordance with some embodiments will be described. An (analog) input signal may be provided to an input 102a of the direct conversion receiver 102. In accordance with the present disclosure, the input signal may be a signal received by antenna 118 or may originate from a transmit signal produced by the direct conversion transmitter 104.

The direct conversion receiver 102 may include a mixer 322 to downconvert the input signal to an operating baseband. In some embodiments, the mixer 322 may produce an in-phase (I) component and a quadrature phase (Q) component. The output of the fixed LO 204 may be mixed with the input signal to block convert the input signal down to an operating baseband I component and an operating baseband Q component. In some embodiments, the fixed LO 204 may provide a 1082 MHz mixing frequency.

The direct conversion receiver 102 may include a dual analog baseband filter block 324, a dual anti-alias filter block 326, and a dual ADC block 328 to process the I and Q components produced by mixer 322. The I and Q components may be processed independently of each other. The I component, for example, may be processed in a first signal path (branch) comprising an analog baseband filter 324a, drive amplifier (e.g., opamp), and an anti-alias filter 326a. The filters 324a, 326a may remove frequency components above the baseband (e.g., noise and harmonics due to non-linearities in the LNA 216, noise and higher harmonics from the mixer 322, etc.) to obtain the baseband I component. An ADC 328a may sample the filtered analog I component to produce a digital n-bit bitstream $I_K$ at an output 102b of the direct conversion receiver 102, which can be provided to the signal processing logic 106. Similarly, the Q component may be processed in a second signal path comprising an analog baseband filter 324b, drive amplifier (e.g., opamp), and an anti-alias filter 326b to remove frequency components above the baseband to obtain the baseband Q component. An ADC 328b may sample the filtered analog Q component to produce a digital n-bit bitstream $Q_K$ at the output 102b, which can be provided to the signal processing logic 106. In a particular implementation, the ADCs 328a, 328b may sample the analog I and Q signals at a 300 MHz sampling rate.

Figure 3B:
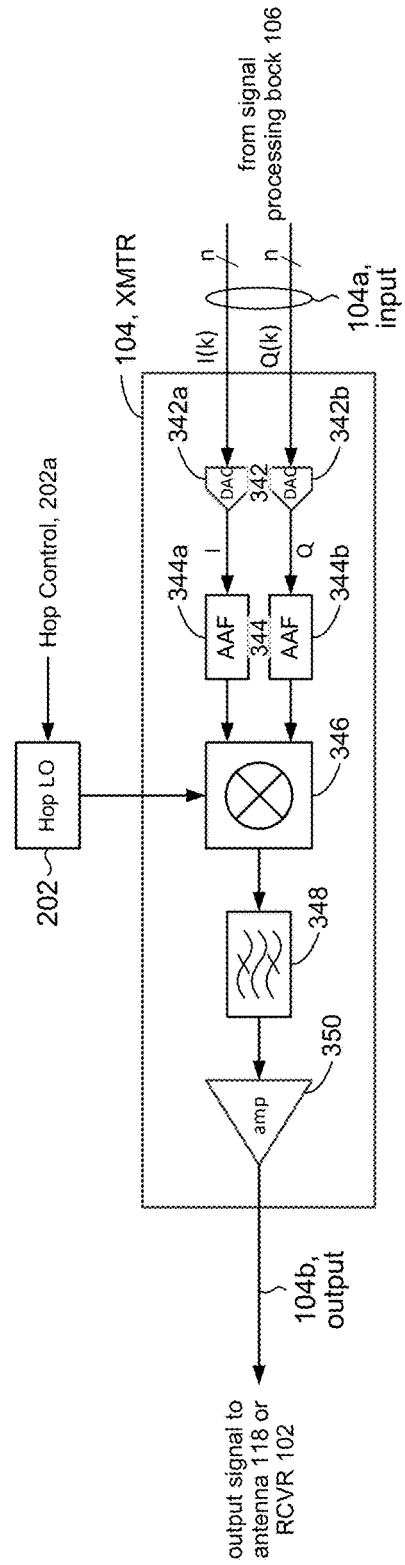

FIG. 3B shows some additional details of direct conversion transmitter 104 in accordance with some embodiments of the present disclosure. The direct conversion transmitter 104 may include a dual DAC block 342, a dual anti-alias filter block 344, a mixer 346, a bandpass filter 348, and an output driver 350. The signal processing logic 106 may provide Link 16 messages for transmission in the form of n-bit $I_K$ and $Q_K$ bitstreams to input 104a of the direct conversion transmitter 104. The $I_K$ bitstream may be converted to an analog I component by DAC 342a. The anti-aliasing filter 344a may remove harmonics in the analog I component that may result from operation of the DAC 342a. Likewise, the $Q_K$ bitstream may be converted to an analog Q component by DAC 342b, and anti-aliasing filter 344b may remove harmonics in the analog Q component that may result from operation of the DAC 342b.

The analog I and Q components may be mixed at mixer 346 with the frequency hopped LO 202. The output of mixer 346 may be bandpass filtered by filter 348 to attenuate frequencies outside of the Link 16 band. Output driver 350 may amplify the output of mixer 346 to produce an output (transmit) signal at output 104b of the direct conversion transmitter 104.

Figure 3C:
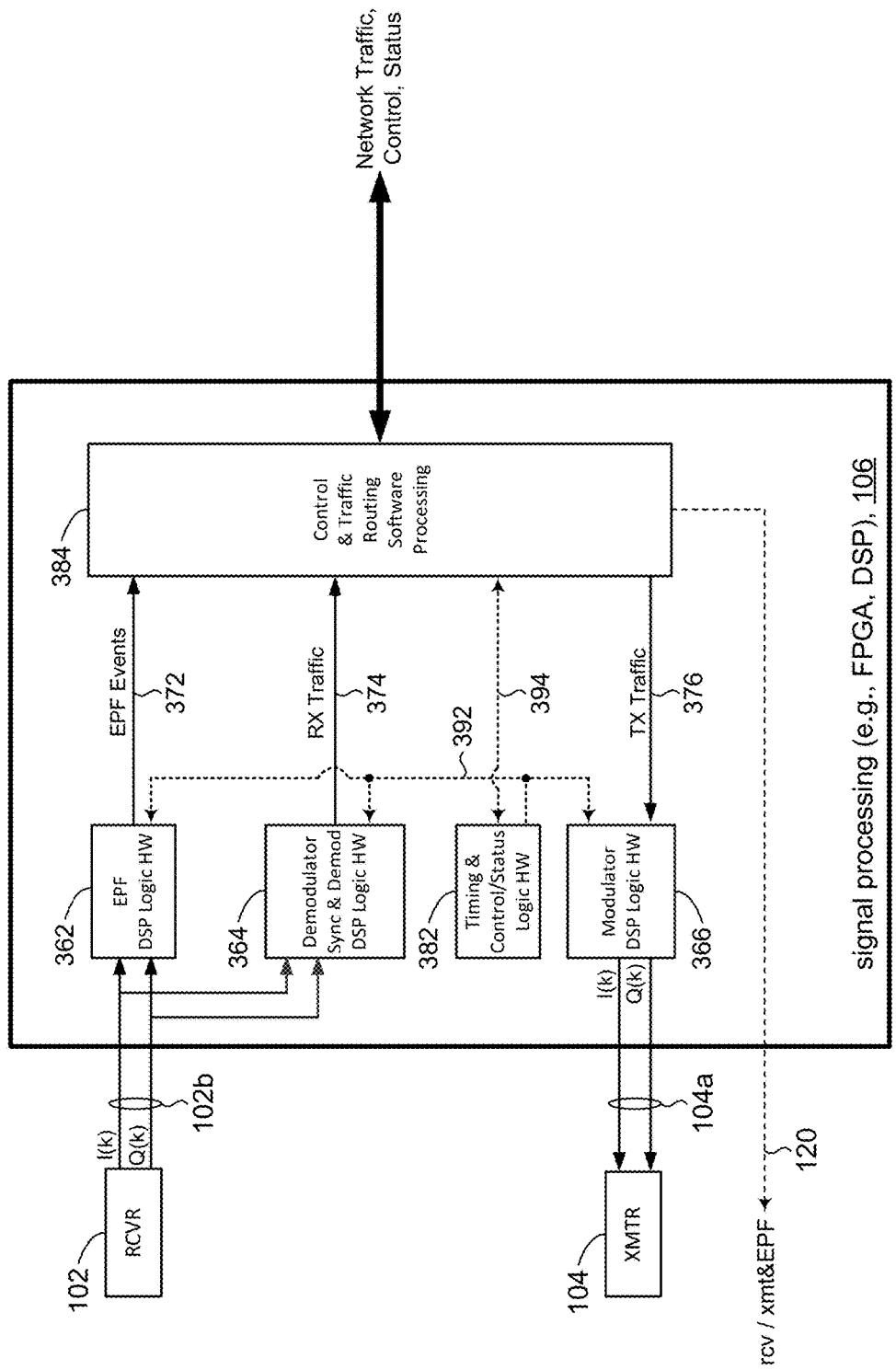
FIG. 3C illustrates a high level block diagram of signal processing logic in accordance with some embodiments of the present disclosure.

FIG. 3C shows additional detail in the signal processing logic 106 in accordance with some embodiments of the present disclosure. In some embodiments, for example, the signal processing logic 106 may include EPF processing logic 362 and sync/demodulator logic 364. In accordance with the present disclosure, the digitized I and Q bitstreams at the output 102b of direct conversion receiver 102 may be provided to both the EPF processing logic 362 and the sync/demodulator logic 364. As will be discussed in more detail below, the EPF processing logic 362 may comprise digital signal processing logic configured to process the I and Q bitstreams to monitor characteristics (e.g., frequency, signal strength, timing, and the like) of a transmit signal for compliance with the EMC Protection Features (EPF) for Link 16 transmissions. The EPF processing logic 362 may generate EPF events 372 in response to detecting out-of-specification conditions in the Link 16 transmission characteristics of the transmit signal. The EPF events 372 may be provided to routing and processing logic 384. This aspect of the present disclosure is explained in more detail below.

The sync/demodulator logic 364 may comprise digital signal processing logic configured to process the I and Q bitstreams to retrieve Link 16 messages contained in a received signal, including an initial synchronizing step to synchronize the timing to the received signal (e.g., a preamble search) followed by a demodulating step to demodulate the received signal. The demodulated signal may be provided as a data stream 374 to the routing and processing logic 384 to retrieve the Link 16 messages.

The signal processing logic 106 may include a modulator 366 comprising digital signal processing logic configured to produce modulated I and Q bitstreams representative of Link 16 pulses for transmission. For example, the routing and processing logic 384 may provide a data stream 376 representing text, data, voice, and so on to the modulator 366 to be modulated for transmission.

The signal processing logic 106 may include timing and control logic 382 to control the timing of the various operations of the Link 16 terminal device 100 (FIG. 1). The timing and control logic 382 may generate various control signals 392 to coordinate the operation of the other logic 362-366. The timing and control logic 382 may generate status information representative of the operational status of the device 100, which can be provided to the routing and processing logic 384 over a status and control line 394. For example, the device 100 may include various visual and audible indicators (e.g., speaker, display, FIG. 1A) that can be driven by the status information to inform the user of the operational status of the device 100. Conversely, the status and control line 394 may provide user-initiated control information to the timing and control logic 382.

Referring for a moment to FIG. 1, in accordance with Link 16 message processing, the Link 16 terminal device 100 may use a transmit/receive schedule to determine, for each time slot in the TDMA channel, whether the time slot is designated for reception (a receive slot) or designated for transmission (a transmit slot). During a receive slot, the device 100 may process signals received by the antenna 118 to retrieve Link 16 messages contained in the received signals. Conversely, during a transmit slot, the device 100 may generate a transmit signal to transmit Link 16 messages via antenna 118. The discussion will now turn to a description of operation of the Link 16 terminal device 100 during receive slots and transmit slots in accordance with the present disclosure.

Figure 4:
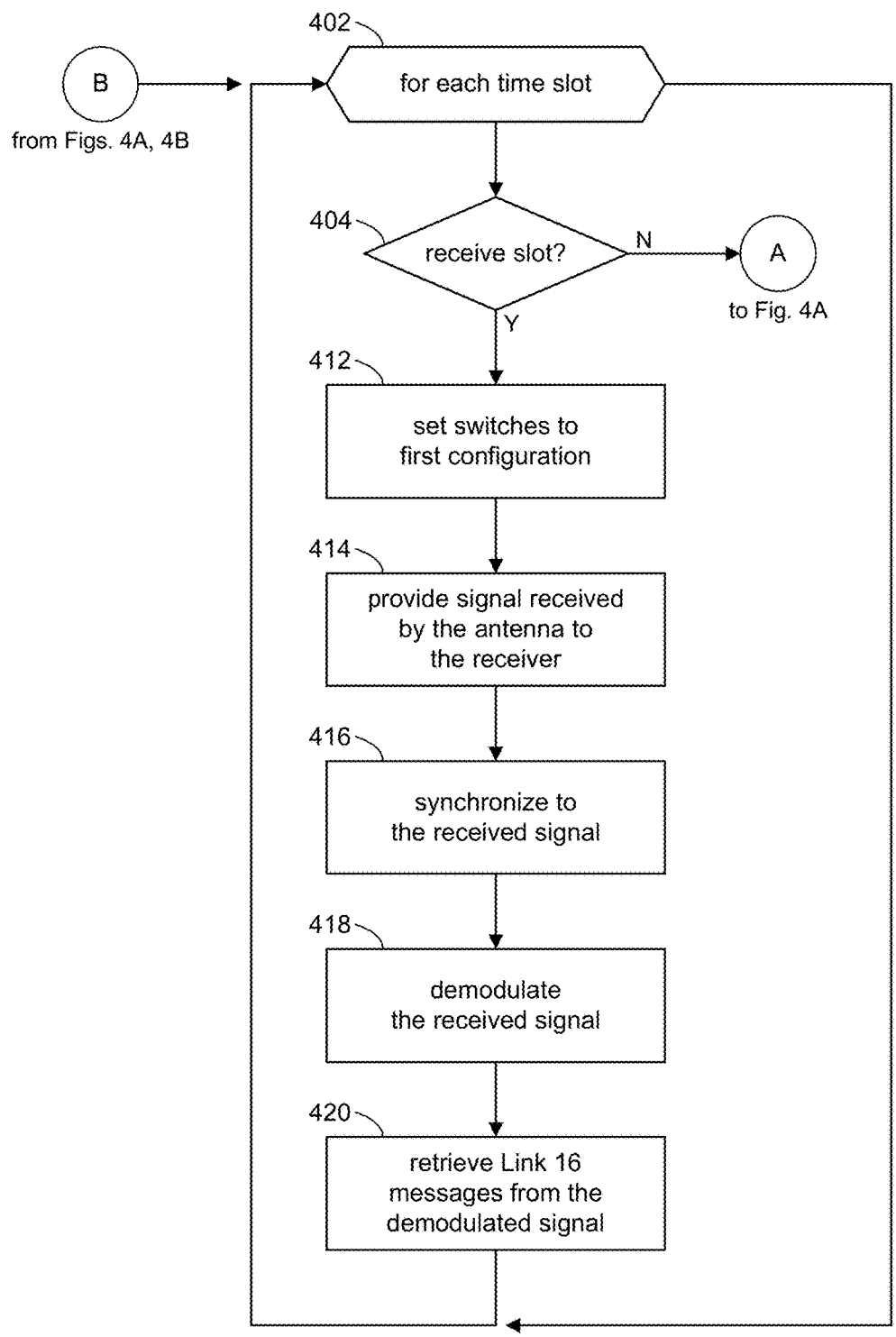
FIGS. 4, 4A, and 4B show processing of a Link 16 terminal in accordance with the present disclosure.
Figure 4A:
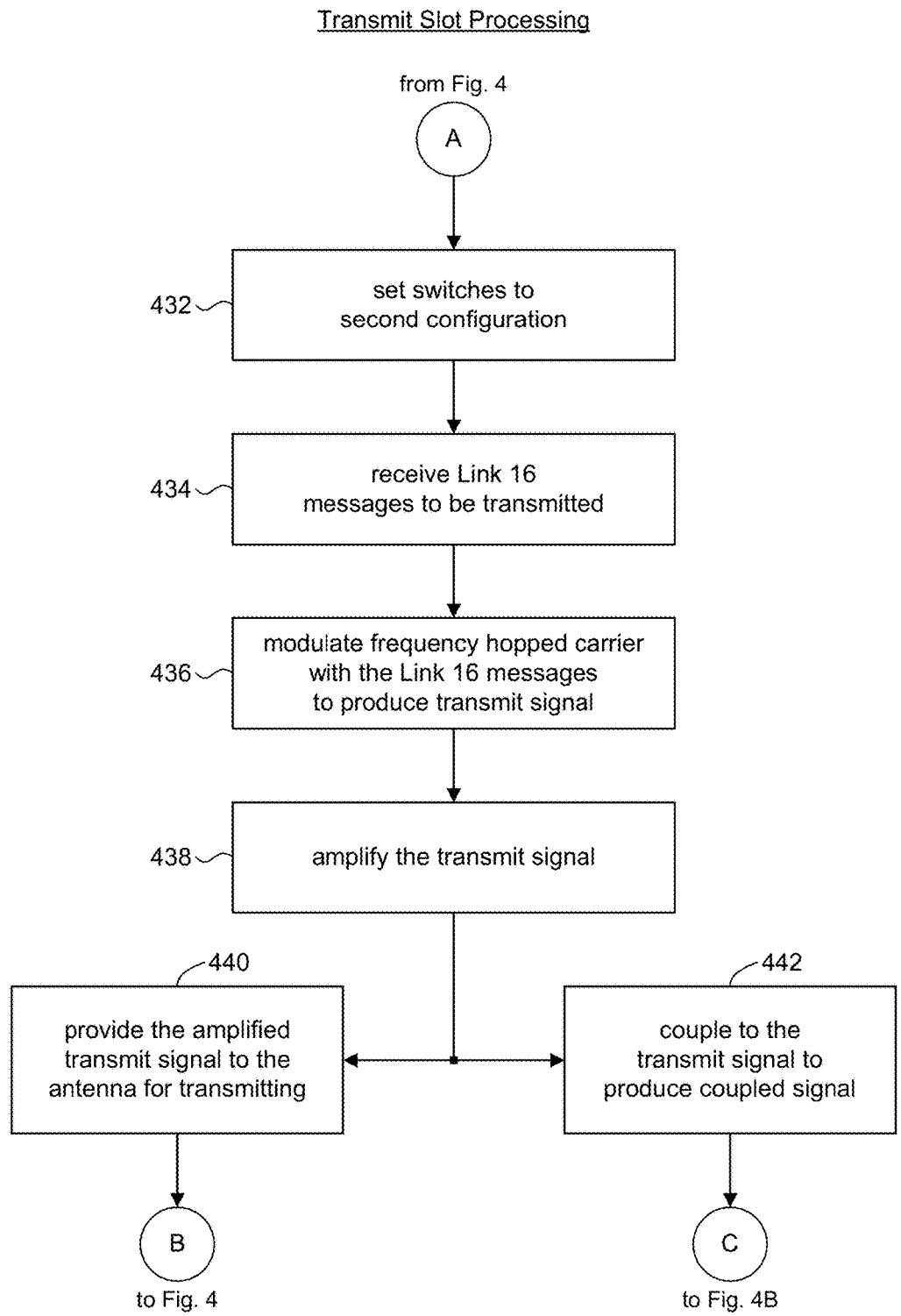
Figure 4B:
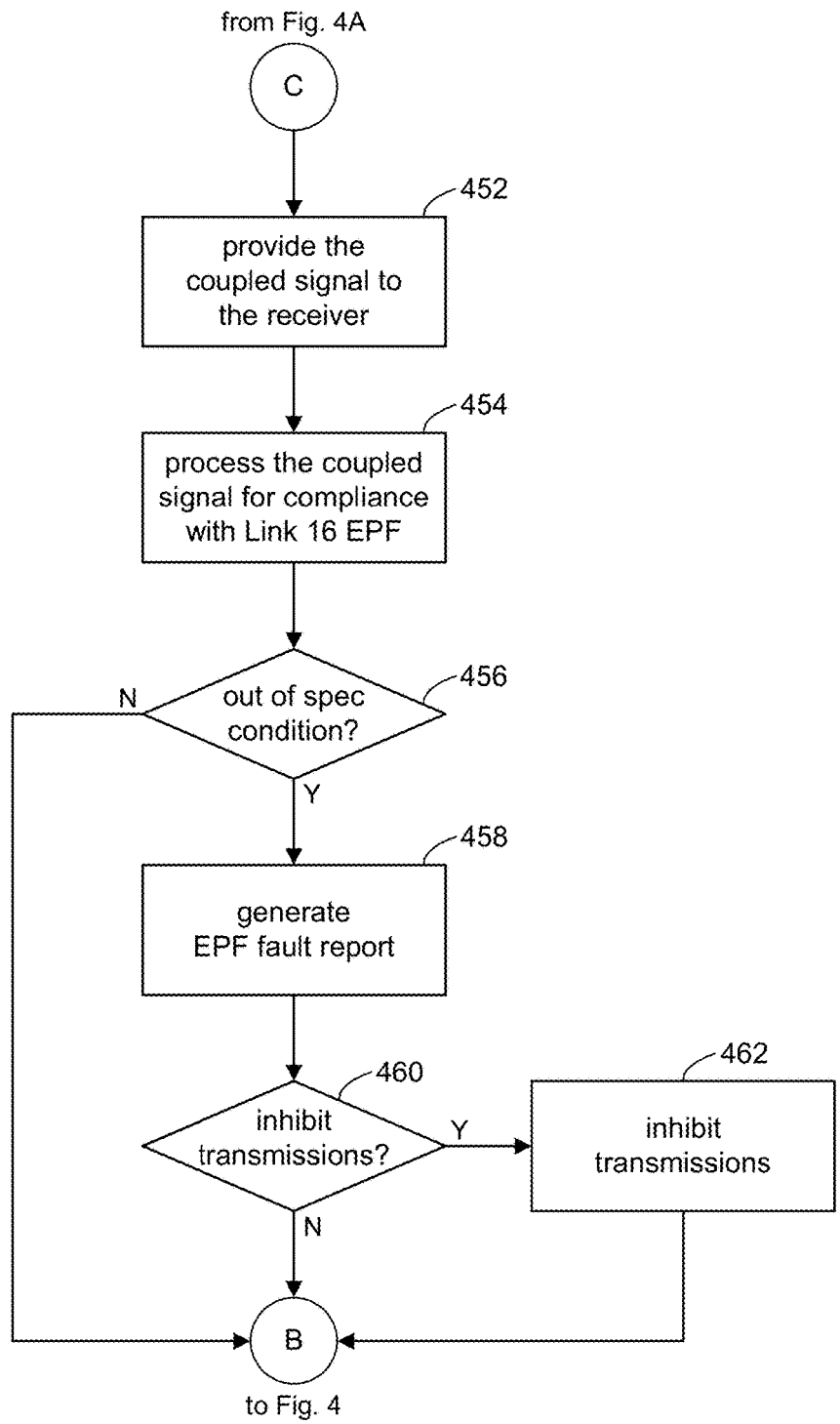

FIGS. 4, 4A, and 4B show a high level description of operation and processing in a Link 16 terminal device 100 in accordance with the present disclosure. The signal processing logic 106 may include computer executable program code, which when executed by a digital processing unit in the signal processing logic 106, may cause the digital processing unit to perform some of the processing in accordance with FIGS. 4, 4A, and 4B.

At block 402, the signal processing logic 106 may process each time slot in accordance with a transmit/receive schedule provided to the device 100. For a given time slot, the signal processing logic 106 may perform the following:

At block 404, if the given time slot is a receive slot (Y branch), then the signal processing logic 106 may continue processing at block 412. Otherwise, the time slot is a transmit slot and processing may proceed (N branch) to connector A and continue at FIG. 4A discussed below.

At block 412, the signal processing logic 106 may assert control signals 120 to set the switches 114, 116 to the first configuration, such as shown in FIG. 2A for example. This configuration of switches 114, 116 establishes a (receive) signal path between the antenna 118 and the direct conversion receiver 102.

At block 414, signals received by the antenna 118 can be provided to the direct conversion receiver 102 via the receive signal path. As explained above, the direct conversion receiver 102 can mix the received signals to downconvert the received signals to an operating baseband. In some embodiments, for example, the received signal may be mixed using a fixed LO frequency of 1082 MHz to produce IQ bitstreams that can be provided to the signal processing logic 106.

At block 416, the signal processing logic 106, and in particular the sync/demodulator logic 364 (FIG. 3C), may perform synchronization to acquire the system time. The system time provides the basis for a reference to identify the beginning and end of the time slots in the TDMA channel. At block 418, the sync/demodulator logic 364 may demodulate the received signal.

At block 420, the sync/demodulator logic 364 may provide the demodulated signal as a data stream 374 to the routing and processing logic 384 to retrieve Link 16 messages contained in the received signal. Processing may loop back to block 402 to perform processing for the next time slot.

Referring back to block 404, if transmit mode is indicated for the given time slot, then processing may proceed to connector A (N branch), where the signal processing logic 106 may continue processing at block 432 in FIG. 4A.

Referring to FIG. 4A, at block 432, the signal processing logic 106 may assert control signals 120 to set the switches 114, 116 to the second configuration, such as shown in FIG. 2B for example. This configuration of switches 114, 116 establishes a (transmit) signal path between the direct conversion transmitter 104 and the antenna 118. In accordance with the present disclosure, this configuration of switches 114, 116 also establishes a (monitor) signal path between the direct conversion transmitter 104 and the direct conversion receiver 102.

At block 434, the signal processing logic 106 may provide a data stream 376 to the modulator 366 for transmission. The data stream 376 may constitute Link 16 messages to be transmitted.

At block 436, the modulator 366 may modulate the data stream 376 (e.g., amplitude and/or phase modulation) to produce I and Q bitstreams. The resulting IQ bitstreams may then be provided to the direct conversion transmitter 104 to modulate a frequency hopped carrier and produce a transmit signal at the output of the direct conversion transmitter 104.

At block 438, the transmit signal may be amplified by amplifier 210 to boost the signal strength to a level suitable for transmission by the antenna 118. At block 440, the amplified transmit signal may be provided to the antenna 118 via coupler 112. Processing in the signal processing logic 106 may loop back to block 402 (FIG. 4) via connector B to perform processing for the next time slot.

At block 442 (concurrent with block 440), in accordance with the present disclosure, the amplified transmit signal provided to the coupler 112 may couple a defined amount of the amplified transmit signal (coupled signal) to the output port C of the coupler 112. Operation of the device 100 may continue via connector C at block 452 in FIG. 4B.

Referring to FIG. 4B, at block 452, the coupled signal at output port C of the coupler 112 may be provided to the direct conversion receiver 102 via switch 116 and variable attenuator 218. As in block 414, the direct conversion receiver 102 can mix the coupled signal to downconvert the coupled signal. For example, the coupled signal may be mixed using a fixed LO frequency of 1082 MHz to produce IQ bitstreams which can be sampled and provided to the signal processing logic 106.

At block 454, the signal processing logic 106, and in particular the EPF processing logic 362 (FIG. 3C), may process the IQ bitstreams (samples) to monitor or otherwise assess characteristics of the coupled signal (and hence the amplified transmit signal) in accordance with the EPF requirements for Link 16 transmissions. The monitoring functions performed in the EPF processing logic 362 may include:

1030/1090 MHz LLD Function—The EPF processing logic 362 may process the IQ samples to make measurements of the energy radiated in the IFF (1030 MHz and 1090 MHz) bands. For example, in the 1030/1090 MHz LLD Function, if the radiated energy in the IFF bands exceeds a reference energy level in a given interval of time, a 1030/1090 event counter is incremented.

Pulse Width Monitor Function—The EPF processing logic 362 may process the IQ samples to make measurements of the envelope of each transmitted pulse. A Pulse Width event counter may be incremented whenever a measured pulse width is not within a range.

Uniform Use of Authorized Carriers (UUAC)—Recall that a Link 16 terminal device 100 may hop among 51 carrier frequencies to transmit pulses. The EPF processing logic 362 may process the IQ samples to make measurements of the frequency of each transmitted pulse, and maintain a tally or count of each frequency detected. These monitored counts may be used to assess the uniformity of hopping frequencies.

In some embodiments, the EPF processing logic 362 may pass event counters (EPF events 372) to the routing and processing logic 384 to evaluate the event counters for out-of-specification conditions (fault evaluation). In other embodiments, the EPF processing logic 362 itself may process the event counters for fault evaluation.

At block 456, the event counters may be evaluated to determine the occurrence of faults, which may be performed in the EPF processing logic 362 or in the routing and processing logic 384. If the evaluation reports no faults (N branch), then processing may loop back to block 402 (FIG. 4) via connector B to perform processing for the next time slot. If the evaluation reports any faults (Y branch), then processing may proceed to block 458 to generate appropriate Fault Reports.

At block 458, various Fault Reports may be generated. For example, an LLD EPF Fault Report may be generated if five or more 1030/1090 events occur in a time slot. Likewise, a Pulse Width EPF Fault Report may be generated if more than 32 Pulse Width event occur in a group of 64 contiguous pulses. To monitor UUAC, the frequency usage from the tallies collected during block 454 may be assessed. Related EPF Fault Reports may be generated when various tallies are outside predetermined limits established pursuant to the EPF requirements for Link 16 transmissions.

At block 460, the routing and processing logic 384 may assess any generated Fault Reports to determine whether to inhibit transmissions in the Link 16 terminal device 100. For example, if two or more Fault reports are generated in a certain time period (e.g., 112.5 Epochs), then at block 462 transmissions in the device 100 can be inhibited in the next time slot designated for transmission (transmission slot). The user may manually reset the device 100 in order to resume transmissions. Processing may loop back to block 402 (FIG. 4) via connector B to perform processing for the next time slot.

Figure 5:
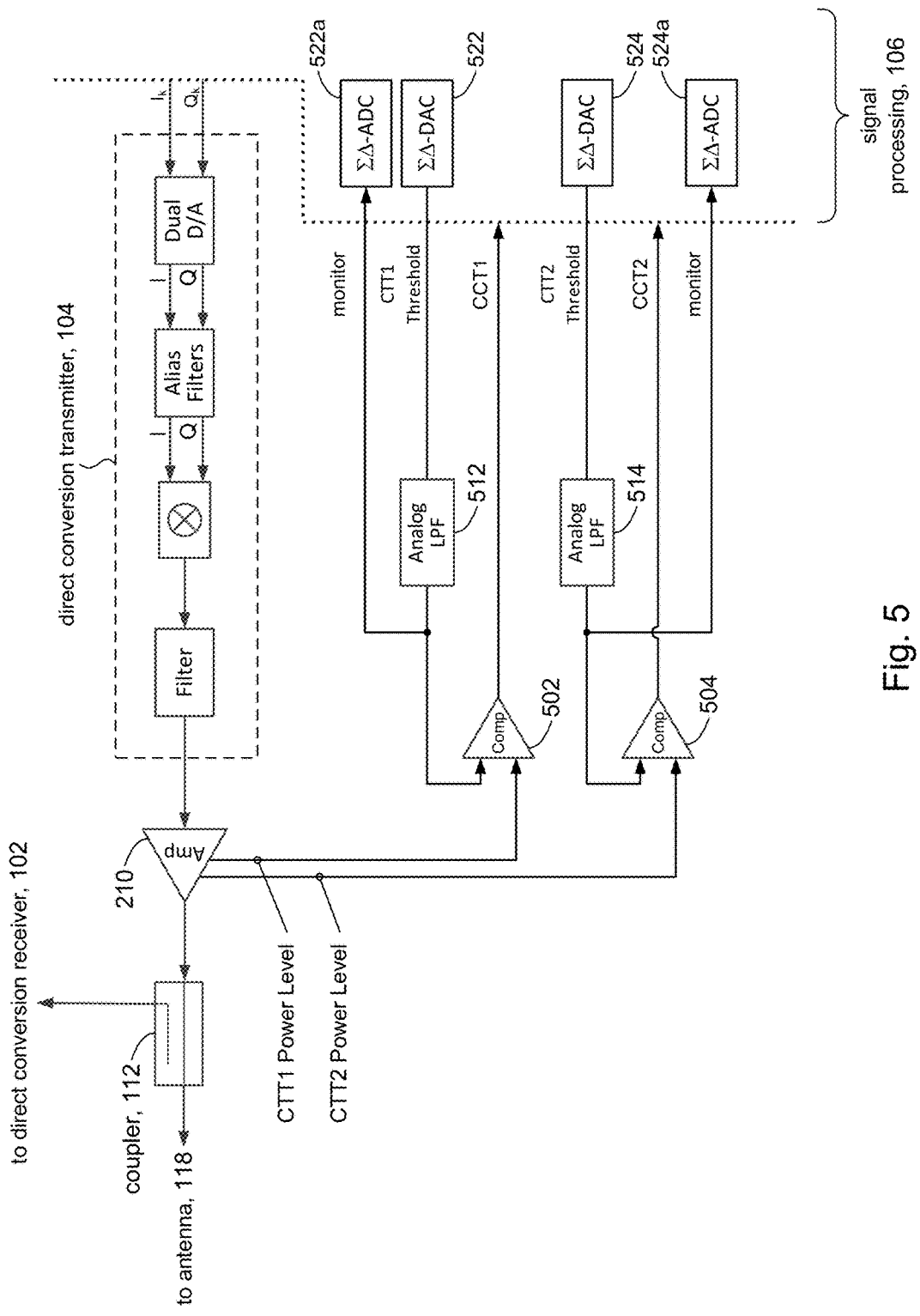
FIGS. 5, 6, 7, 8, and 9 illustrate examples of EPF monitoring functions in accordance with some embodiments of the present disclosure.

The discussion will now turn to a brief description of some EPF feature monitors provided in a Link 16 terminal device 100. FIG. 5 shows details for an EPF monitor called capability to transmit (CTT), which monitors a signal characteristic of the RF output power amplifier 210 to detect the presence of transmit energy when pulses have not been commanded for transmission, and vice versa to detect the absence of transmit energy when pulses have been commanded for transmission.

In some embodiments, the amplifier 210 may be a multistage amplifier (e.g., a two-stage amplifier). The energy (e.g., CTT1 and CTT2 power levels) from each amplifier stage may be monitored. For example, the CTT1 and CTT2 power levels may be the measured outputs of the amplifier stages, measurements from inter-stage power sensors, gate bias voltages in the amplifier stages, and the like. Voltage comparators 502, 504 may compare the CTT1 and CTT2 power levels with respective detection thresholds (e.g., CTT1 and CTT2 detection thresholds). The outputs (CTT1, CTT2) from comparators 502, 504 may be provided to the EPF processing logic 362 to determine the occurrence of CTT events. When two or more CTT events occur in a time slot, a CTT fault may be reported. When two or more CTT Fault Reports are generated in a certain time period, the amplifier 210 may be switched off to inhibit transmission; e.g., by switching off a power supply (not shown) to the amplifier 210.

In some embodiments, the CTT1 and CTT2 detection thresholds may be sourced from the signal processing logic 106 using respective sigma-delta DACs 522, 524 provided in the signal processing logic 106. The CTT1 and CTT2 detection thresholds may be filtered through respective low pass filters 512, 514 to remove harmonics that may result from the DAC conversion. In a particular implementation, for example, the low pass filters 512, 514 may be third order Butterworth low pass filters. In some embodiments, to ensure proper operation, the signal processing logic 106 may monitor (e.g., using respective sigma-delta ADCs 522a, 524a) and adjust the CTT1 and CTT2 detection thresholds generated by the sigma-delta DACs 522, 524.

Figure 6:
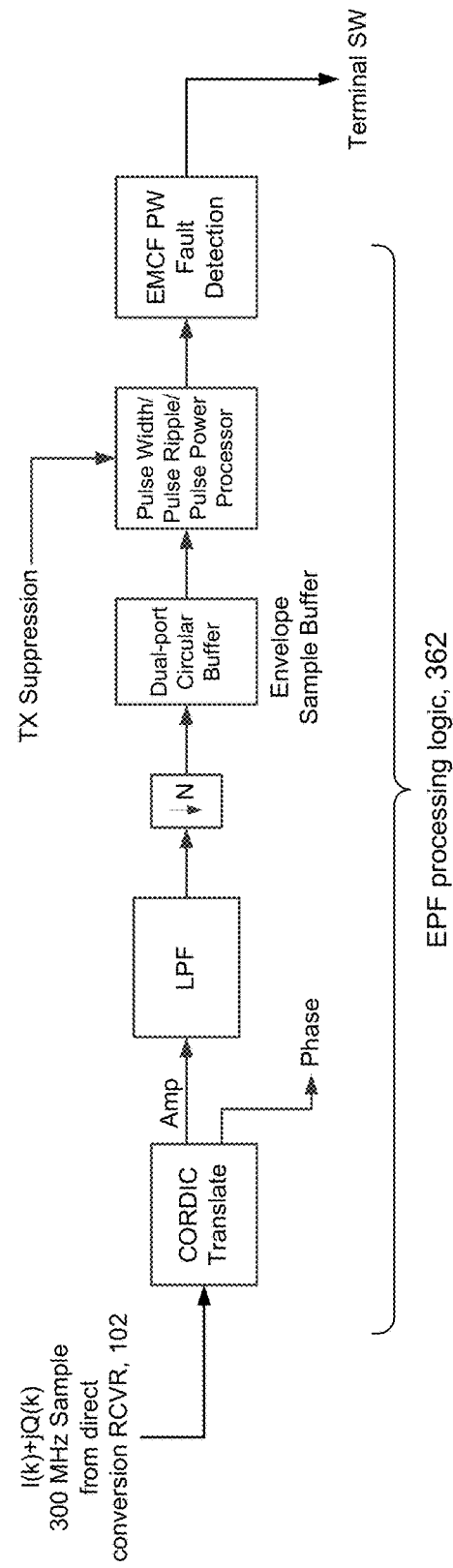

FIG. 6 shows details for the Pulse Width Monitor Function performed in the EPF processing logic 362, to monitor pulse width and pulse power. In accordance with the present disclosure, the function provided by conventional RF envelope detectors in the analog domain can be provided by the EPF processing logic 362 in the digital domain, using for example, a known algorithm called coordinate rotation digital computer (CORDIC) for amplitude computations. To mitigate the effect of pulse ripples due to uncompensated IQ imbalance, a low-pass filter (LPF) may be added before the pulse width and pulse power computation. In some embodiments, Farrow fraction delay equalization may be performed before the CORDIC to reduce ripple from the image component.

Pulse shape samples may be stored in dual-port buffers for post processing. Upon collecting all samples in one pulse duration, pulse power may be computed as a linear power average in the middle 3.2 μs duration. The pulse width may be computed as a difference of sample positions between the first and last sample that exceeds 95% of the amplitude level of average power.

Figure 7:
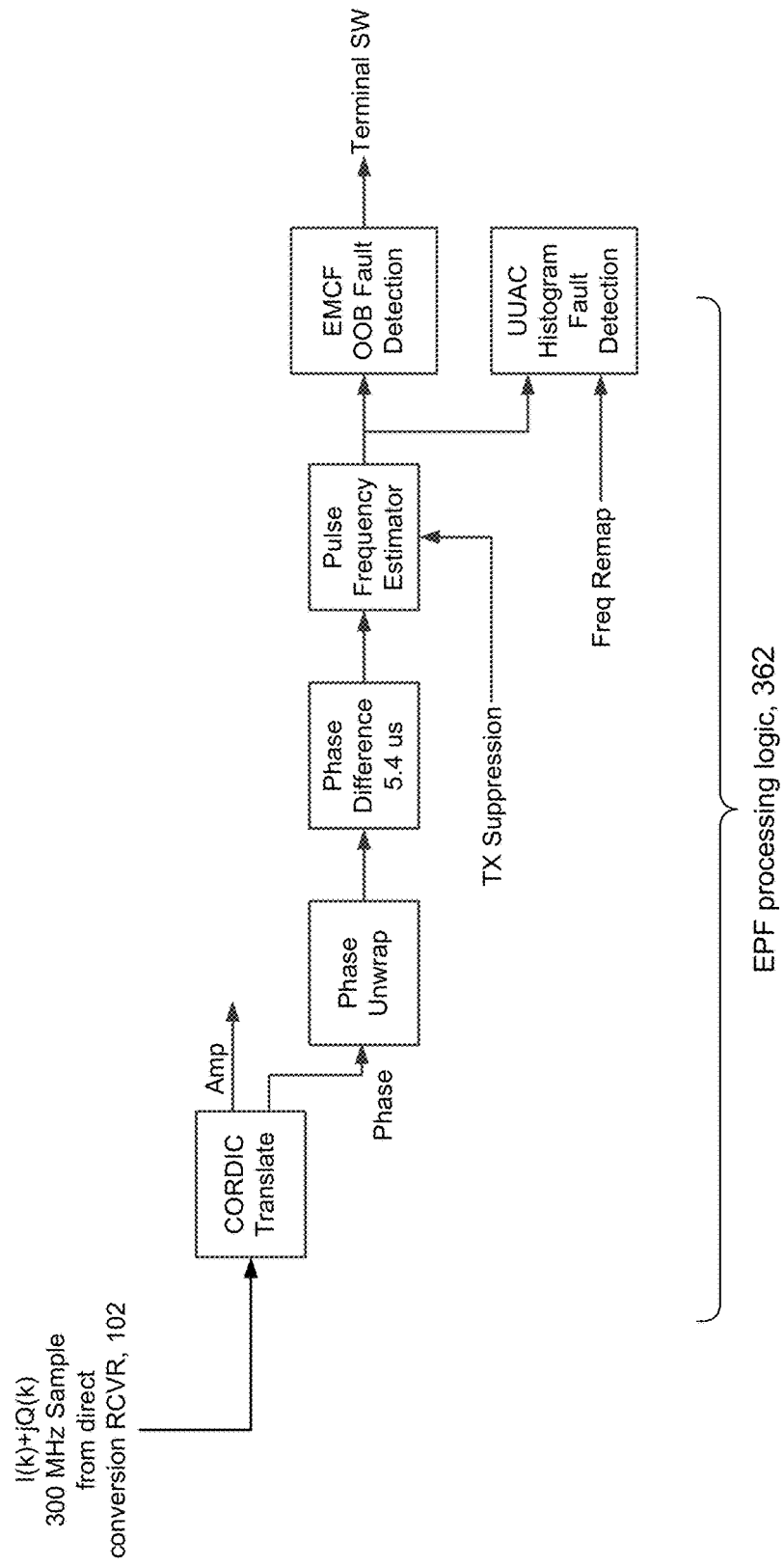

FIG. 7 shows details relating to monitoring for the Uniform Use of Authorized Carriers (UUAC) performed in the EPF processing logic 362. Recall from FIG. 6, that to perform pulse frequency measurement, the CORDIC algorithm can be used to compute both phase and amplitude of the input IQ samples after pipeline delays. The computed phases may be used for UUAC monitoring. By calculating the difference between beginning and ending phases, the carrier frequency of the transmitted pulse over 5.4 μs detection period can be estimated. Since deviation of the estimated frequency is affected by data modulation, the worst-case deviation can be ±1.25 MHz of the MSK modulation. Upon detecting pulse frequencies, UUAC histogram tests can be performed to determine out of bound (OOB) conditions and histogram based faults in accordance with the Link 16 transmission requirements.

Figure 8:
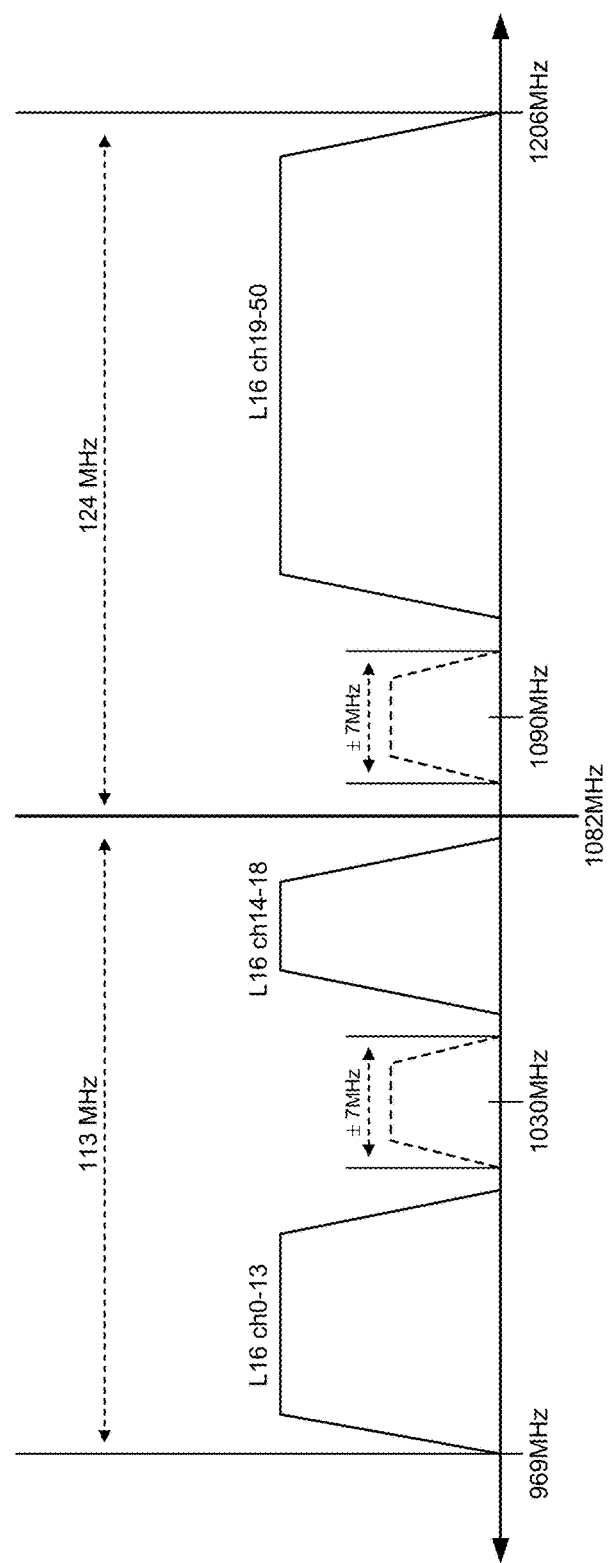
Figure 9:
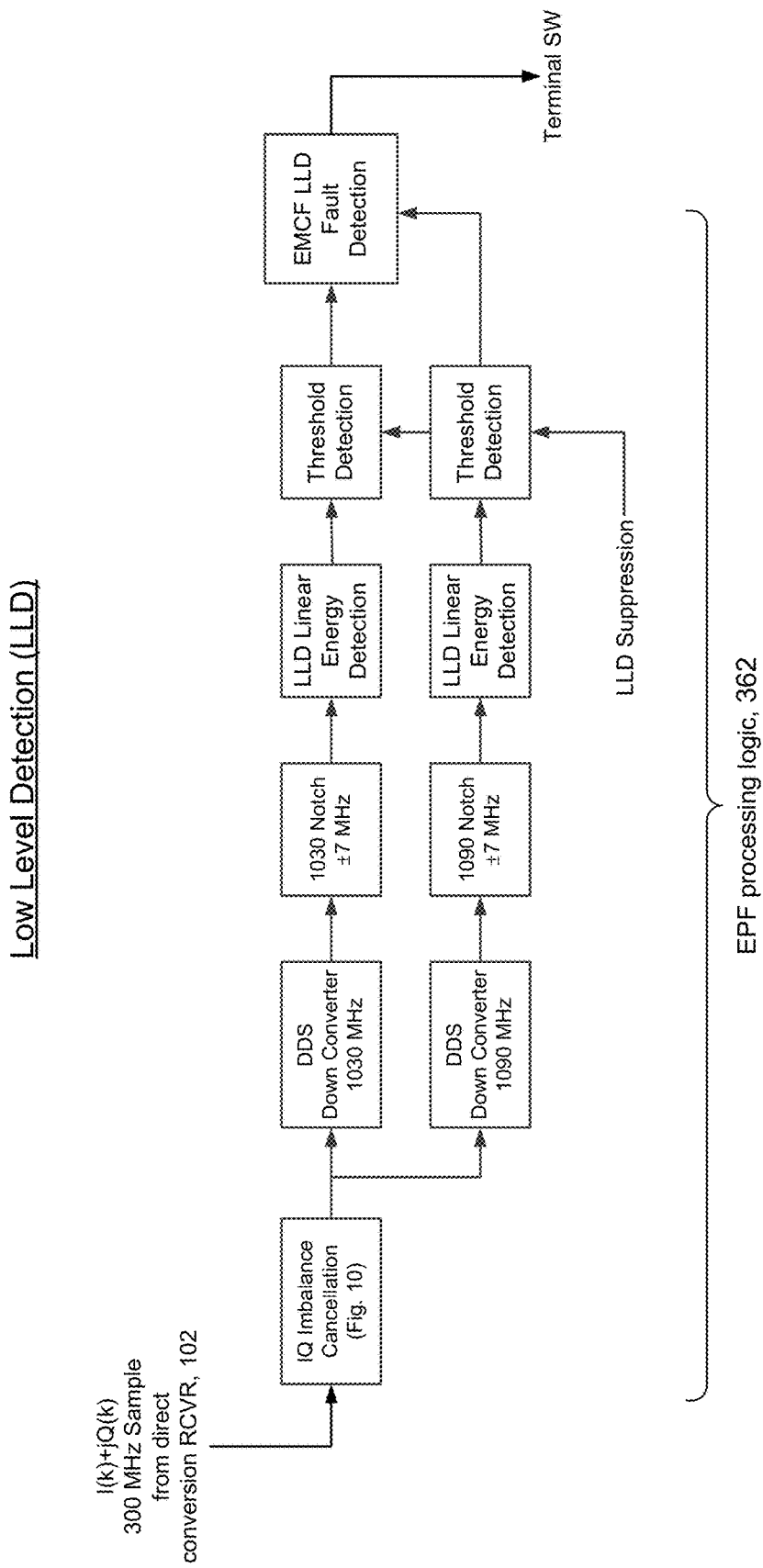

FIGS. 8 and 9 show details relating to the LLD Function, which monitors transmissions for potential interference in the IFF bands. The overall usage of the Link 16 spectrum in accordance with the present disclosure is shown in FIG. 8. Link 16 transmissions occur in the range of 969-1206 MHz using 51 frequency hopped carriers, spaced at 3 MHz. The IFF bands are centered at 1030 MHz and 1090 MHz with a ±7 MHz spread at each center frequency. The Link 16 channels (0-50) are partitioned into three groups of channels (0-13, 14-18, and 19-50) distributed around the IFF bands. As noted above, in a particular implementation of an embodiment in accordance with the present disclosure, the RF LO carrier frequency (e.g., fixed LO 204) of the direct conversion receiver 104 may be fixed at 1082 MHz, which lies roughly in the center of the Link-16 operating frequencies (1087.5 MHz) while avoiding operation in the 1090±7 MHz IFF exclusion band.

FIG. 9 shows details for LLD detection performed in the EPF processing logic 362. LLD detection processing in accordance with the present disclosure may include compensating for an IQ imbalance that can arise in the direct conversion receiver 102. IQ imbalance may create pulse ripples that can degrade pulse width measurement accuracy. Additionally, if IQ imbalance is not properly compensated, the imbalance can introduce false LLD detection from inadequate image rejection due to mirrored Link 16 transmission. Accordingly, in accordance with the present disclosure, the EPF processing logic 362 may perform IQ imbalance cancellation as an initial step in the LLD function. This is illustrated in FIG. 9, and is explained in more detail below. The EPF processing logic 362 may use direct digital synthesis (DDS) to perform down conversion of the I and Q sample streams. The EPF processing logic 362 may apply bandpass filters to isolate the IFF bands (1030 MHz±7 MHz and 1090 MHz±7 MHz). The EPF processing logic 362 may then perform low level detection (LLD) of the isolated IIF bands for compliance with requirements for Link 16 transmissions.

Figure 10:
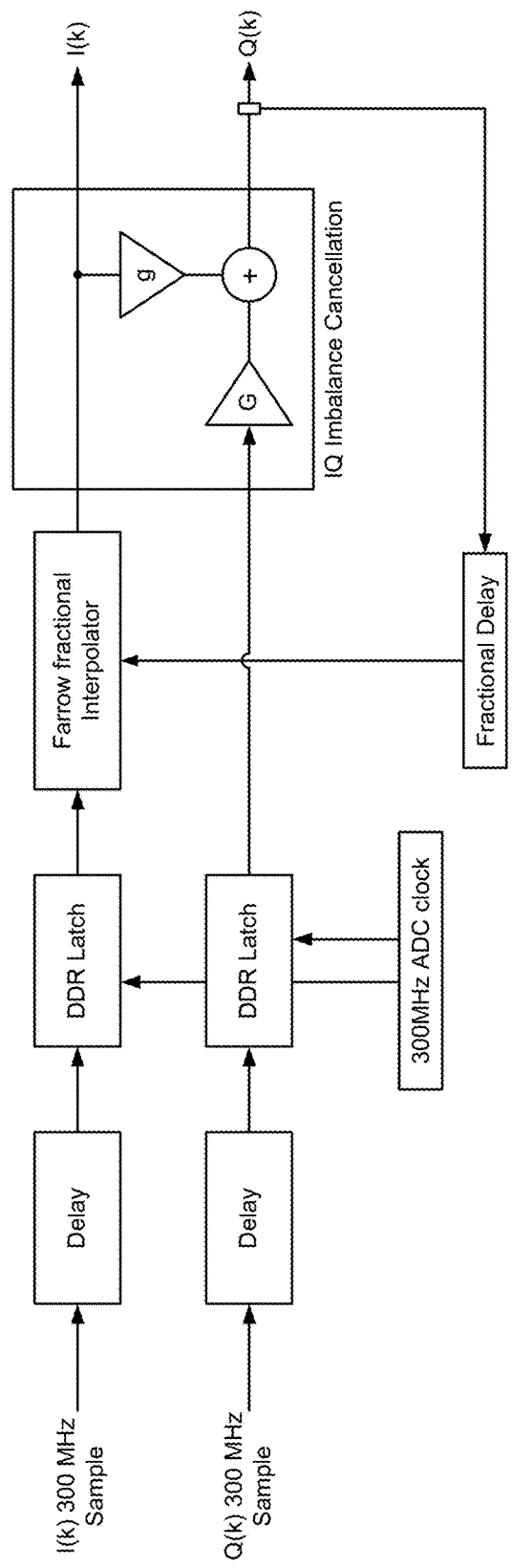
FIG. 10 illustrates IQ imbalance compensation in accordance with some embodiments of the present disclosure.

FIG. 10 shows details for compensating IQ imbalance performed in the EPF processing logic 362. IQ imbalance in the direct conversion receiver 102 is an inherent impairment primarily owing to concurrent IQ mixing in mixer 322 and sampling of the RF signal along disparate RF and analog IQ chains (signal paths) 324a-328a and 324b-328b. Mismatches and non-ideal I and Q generation of RF LO can result in gain and phase imbalance of the IQ branches. IQ imbalance may arise from various sources:

ADC sampling clock skew between I and Q in the dual ADC block 328 (FIG. 3A) may create phase imbalance that is linearly dependent on the offset carrier frequency. Clock skew can arise from differences of clock buffer delay for use in IQ ADC sampling.

In addition to sampling clock skew, phase imbalance may arise due to imperfect matching of the IQ analog baseband filters 324a, 324b. Additionally, the 0-90° LO phase splitting in the mixer 322 can have imperfect phase error.

Gain imbalance can arise due to imperfect matching of analog gain in the IQ analog baseband filters 324a, 324b. Gain imbalance is usually frequency dependent due to imperfect matching of the low-pass filter (LPF) responses between the I and Q branches. The gain imbalance can be more severe around the LPF cutoff frequencies.

A large contributing factor gain/phase imbalance between I and Q are component tolerances along the analog paths 324a-328a and 324b-328b, which lead to mismatches between the two paths. These imbalances are usually dominated by the most dispersive devices (e.g., the filters 324a, 324b, 326a, 326b).

In some embodiments, the I(k) and Q(k) samples from the direct conversion receiver 102 may be sampled using an internally generated clock (e.g., 300 MHz clock) in order to maintain precise time alignment without crossing clock domains. The DDRs may latch and convert the I(k) and Q(k) samples from the direct conversion receiver 102 to concurrent IQ datastreams. Right after sampling, a Farrow fractional interpolator may perform clock skew compensation. For gain compensation, a simple multiplier can digitally mitigate the gain imbalance. For phase imbalance compensation, linear transformation to remove leaked I and Q branches can be executed using an adder and a multiplier.

Figure 10A:
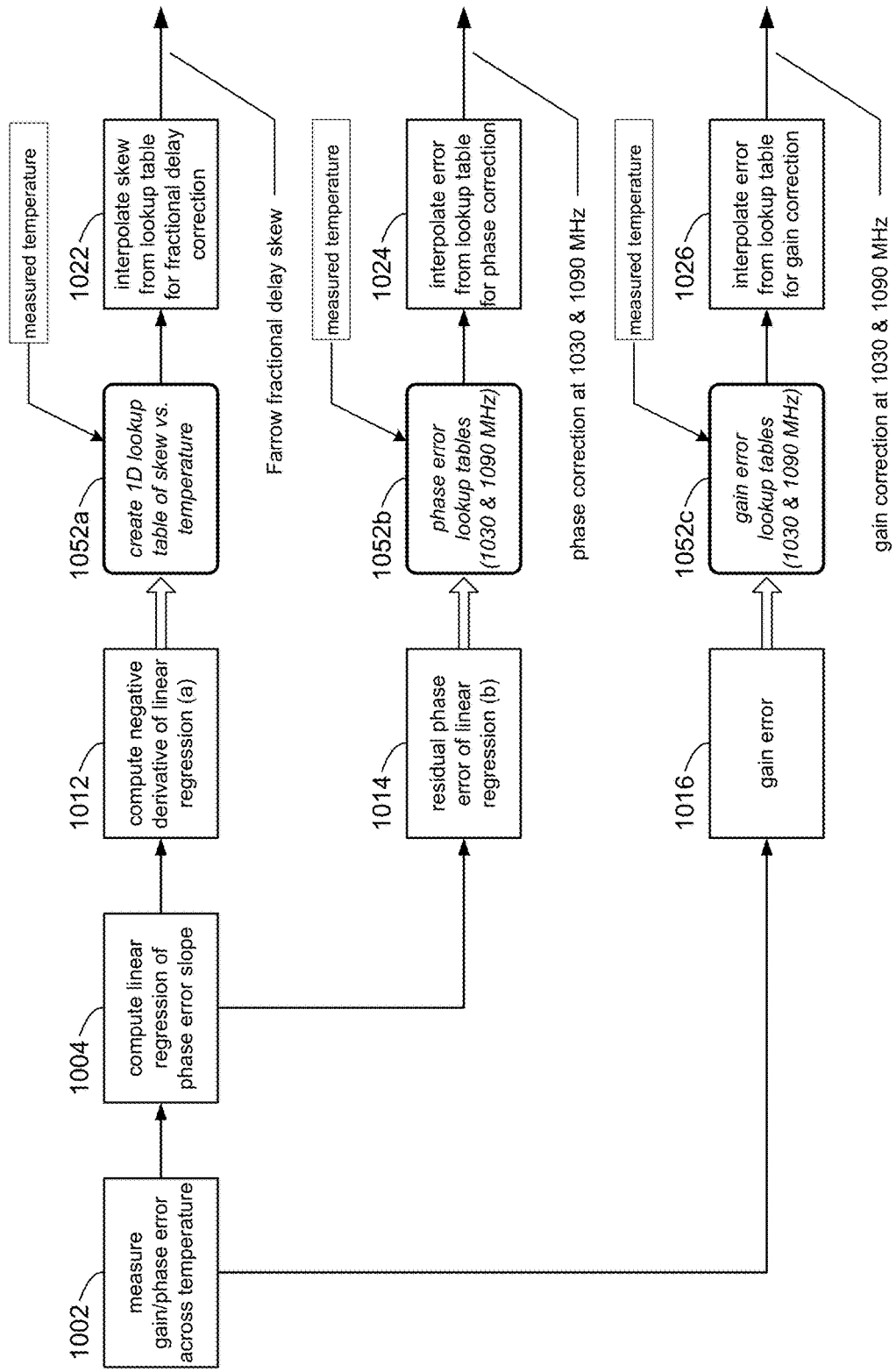
FIG. 10A illustrates detail relating to IQ imbalance compensation in accordance with some embodiments of the present disclosure.

FIG. 10A illustrates details for generating skew and gain/phase corrections in accordance with some embodiments of the present disclosure. Gain and phase errors may vary across temperature. Accordingly, at 1002, for each Link 16 terminal device 100 gain and phase errors may be measured in a thermal chamber at a number of discrete temperatures to obtain gain/phase error measurements across temperature and frequency. In some embodiments, the temperature may be measured on the ground plane of a printed circuit board comprising the direct conversion receiver 102. Once the gain/phase errors are measured, skew corrections, gain corrections, and phase corrections can be generated and stored in respective lookup tables 1052a, 1052b, 1052c for interpolation relative to the measured temperature. The gain and phase corrections may be determined at 1030 MHz and at 1090 MHz.

At 1004 the skew corrections may be computed. In some embodiments, for example, the skew may be computed from a linear regression of the phase error across the frequencies of interest (1030 & 1090 MHz). The phase error may be expressed as:

$$y=ax+b,$$

where y represents error,
x represents frequency,
a represents phase slope, and
b represents residual phase (phase offset).

At 1012, a negative derivative of this slope may be computed to produce the time skew of the Q path. At 1014, residual phase errors at 1030 & 1090 MHz may be used for phase corrections between the I and Q paths. At 1016, gain errors at 1030 & 1090 MHz may be used to correct the gain imbalance between the I and Q paths. The resulting data in the lookup tables 1052a-1052c may represent correction data specific to each Link 16 terminal device 100. In other embodiments, the lookup tables 1052a-1052c may be used to represent correction data for a group of Link 16 terminal devices 100; e.g., in a production lot.

At block 1022, a measured temperature may be used to determine a fractional delay. For example, the measured temperature may be used to interpolate a skew value from the skew vs. temperature lookup table 1052a. At block 1024, the measured temperature may be used to determine a phase for phase correction; e.g., the measured temperature may be used to interpolate a phase error from the phase error vs. temperature lookup table 1052b. Similarly, at block 1026, the measured temperature may be used to determine a gain correction, for example, by interpolating a gain error from the gain error vs. temperature lookup table 1052c.

Figure 11:
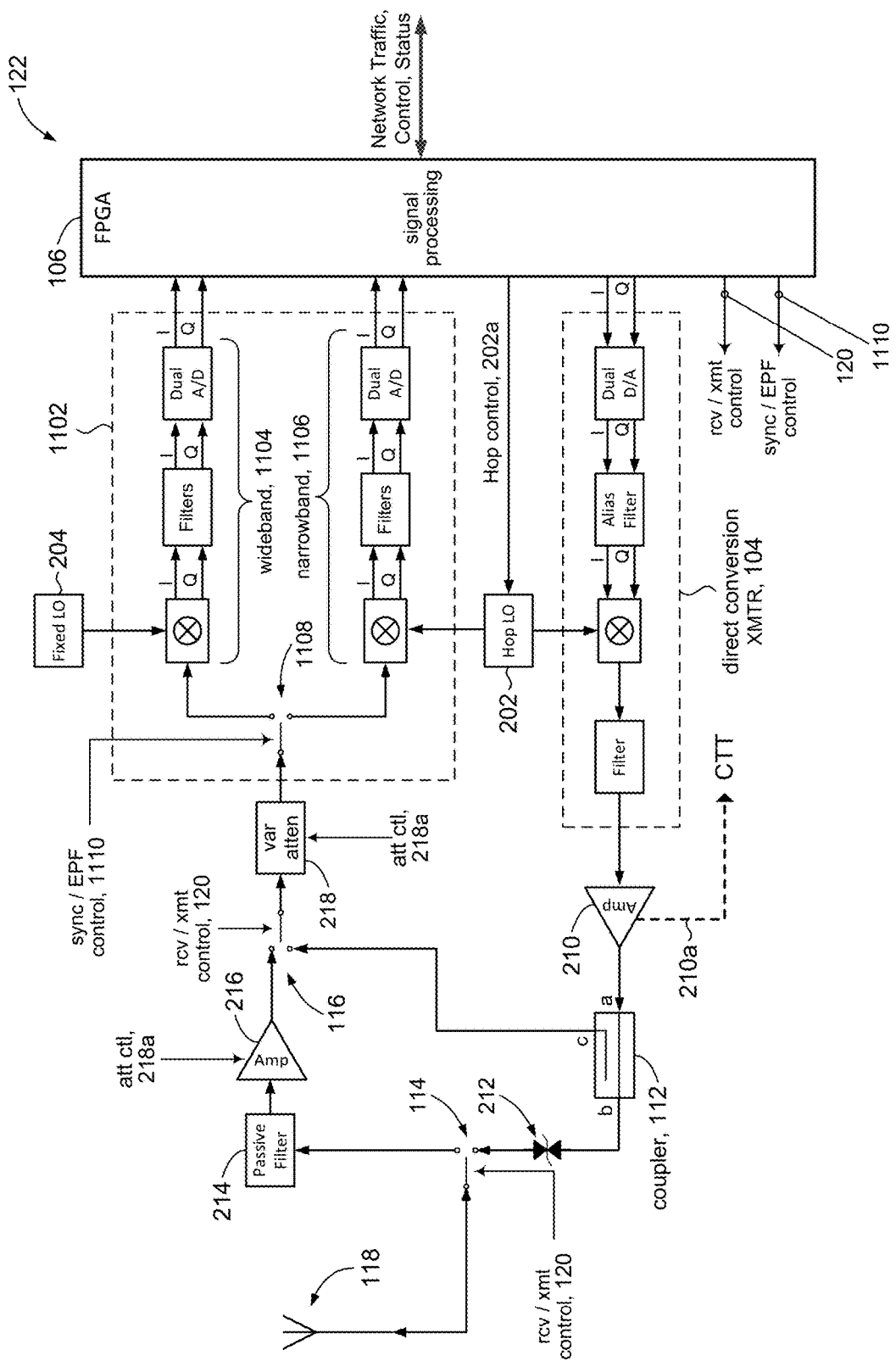
FIGS. 11 and 11A show a receiver configuration having wideband and narrowband components in accordance with some embodiments of the present disclosure.
Figure 11A:
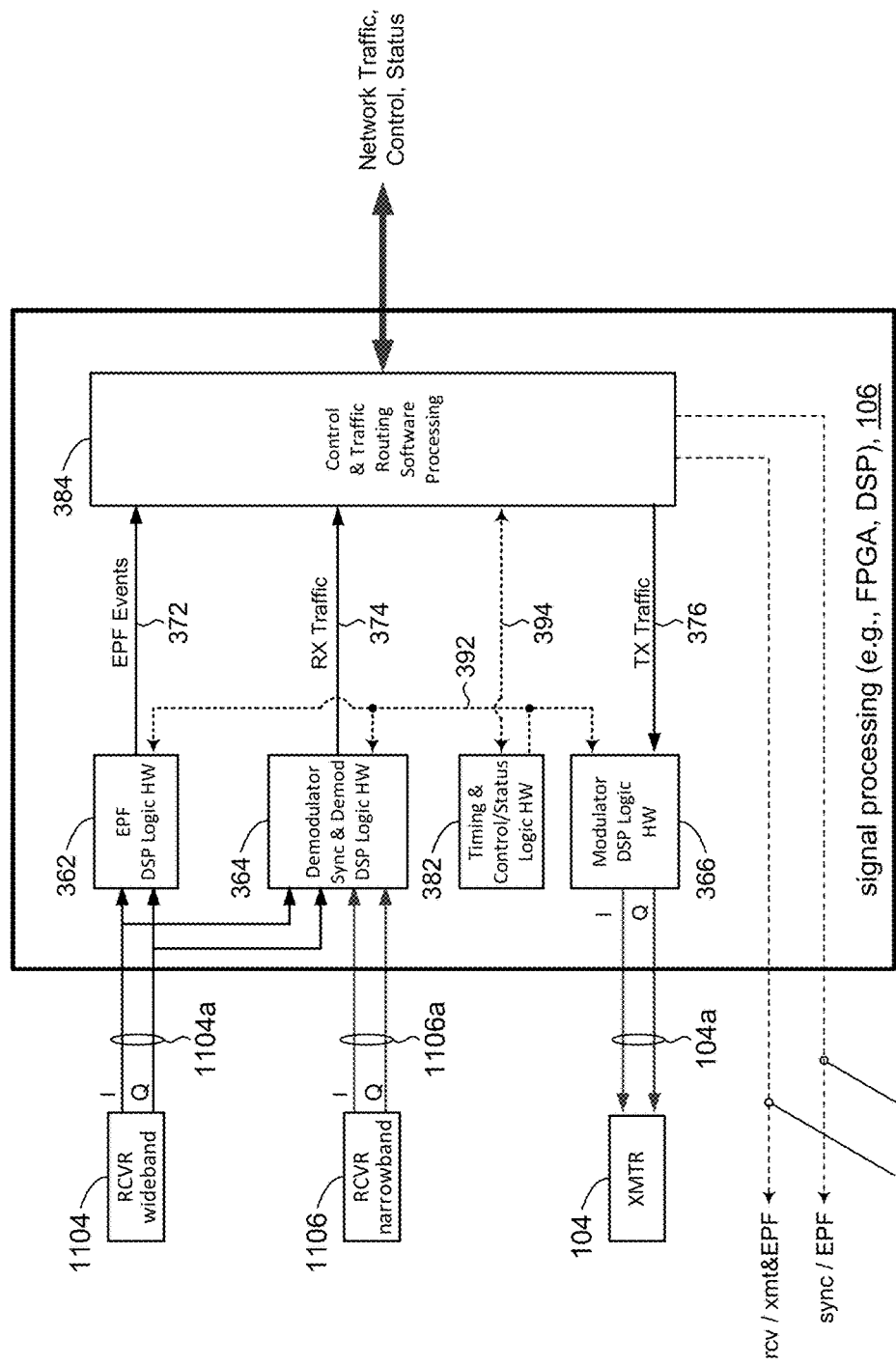

Referring to FIG. 11, in some embodiments, the front-end circuitry 122 may comprise a direct conversion receiver 1102 having a wideband component 1104 and a narrowband component 1106. Both the wideband component 1104 and the narrowband component 1106 may be configured to perform direct conversion of signals down to appropriate operating basebands for subsequent processing by the signal processing logic 106. As shown in FIG. 11A, outputs 1104a of the wideband component 1104 may be provided to the EPF processing logic 362 and sync/demodulator logic 364. Outputs 1106a of the narrowband component 1106 may be provided to the sync/demodulator logic 364. Continuing with FIG. 11, a switch 1108 may provide the output from variable attenuator 218 to either the wideband component 1104 or the narrowband component 1106 of the direct conversion receiver 1102 in response to a control signal 1110 produced in the signal processing logic 106. The frequency hopped LO 202 may provide frequency hopping to vary the tuning in the narrowband component 1106. Receive mode and transmit mode operations will now be described.

Figure 12A:
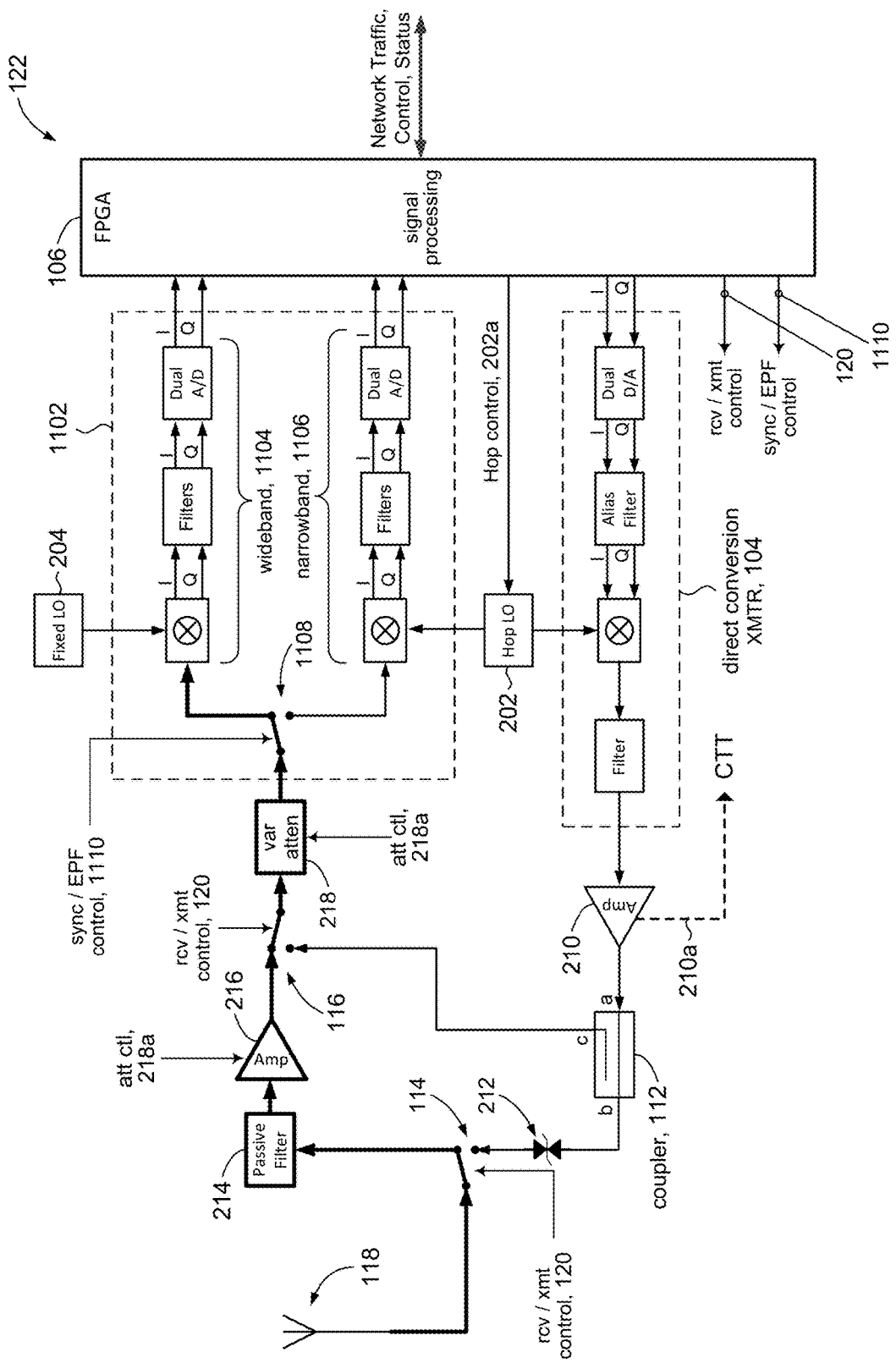
FIGS. 12A and 12B illustrate receive mode configurations of the circuitry shown in FIG. 11.

Referring to FIG. 12A, in a first step during operation in receive mode, the switches 114, 116, 1108 may be operated to establish a signal path between the antenna 118 and the wideband component 1104. In accordance with the present disclosure, the bandwidth of the wideband component 1104 may span the Link 16 band. The wideband component 1104 can therefore provide the full Link 16 spectrum to the sync/demodulation logic 364 to perform synchronization with the received signal (e.g., perform a preamble search).

Figure 12B:
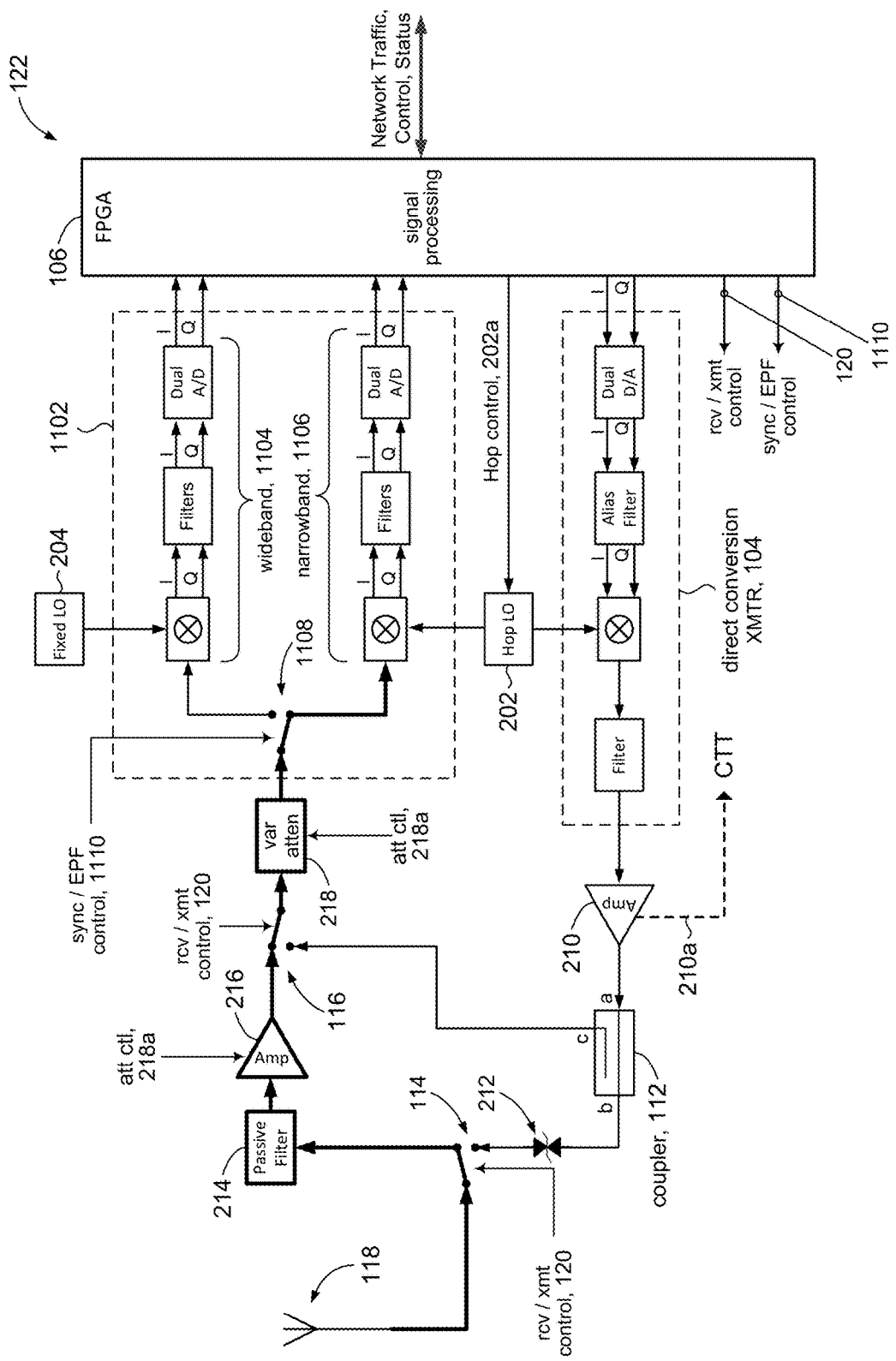

Referring to FIG. 12B, in a second step during operation in receive mode, subsequent to synchronization, the switches 114, 116, 1108 may be operated to establish a signal path between the antenna 118 and the narrowband component 1106. Since the timing is now synchronized with the received signal, the narrowband component 1106 can be hopped according to the frequency hopping pattern of the sending device (not shown) to demodulate the received signal. The presence of the wideband component 1104 for the synchronization function allows the narrowband component 1106 to be configured with a narrow bandwidth response characteristic that matches the 3 MHz band of each Link 16 channel, rather than having to accommodate the full Link 16 spectrum for synchronization. As such, the narrowband component 1106 can be resistant to jamming frequencies by virtue of its narrow bandwidth; much of the Link 16 bandwidth is filtered.

Figure 12C:
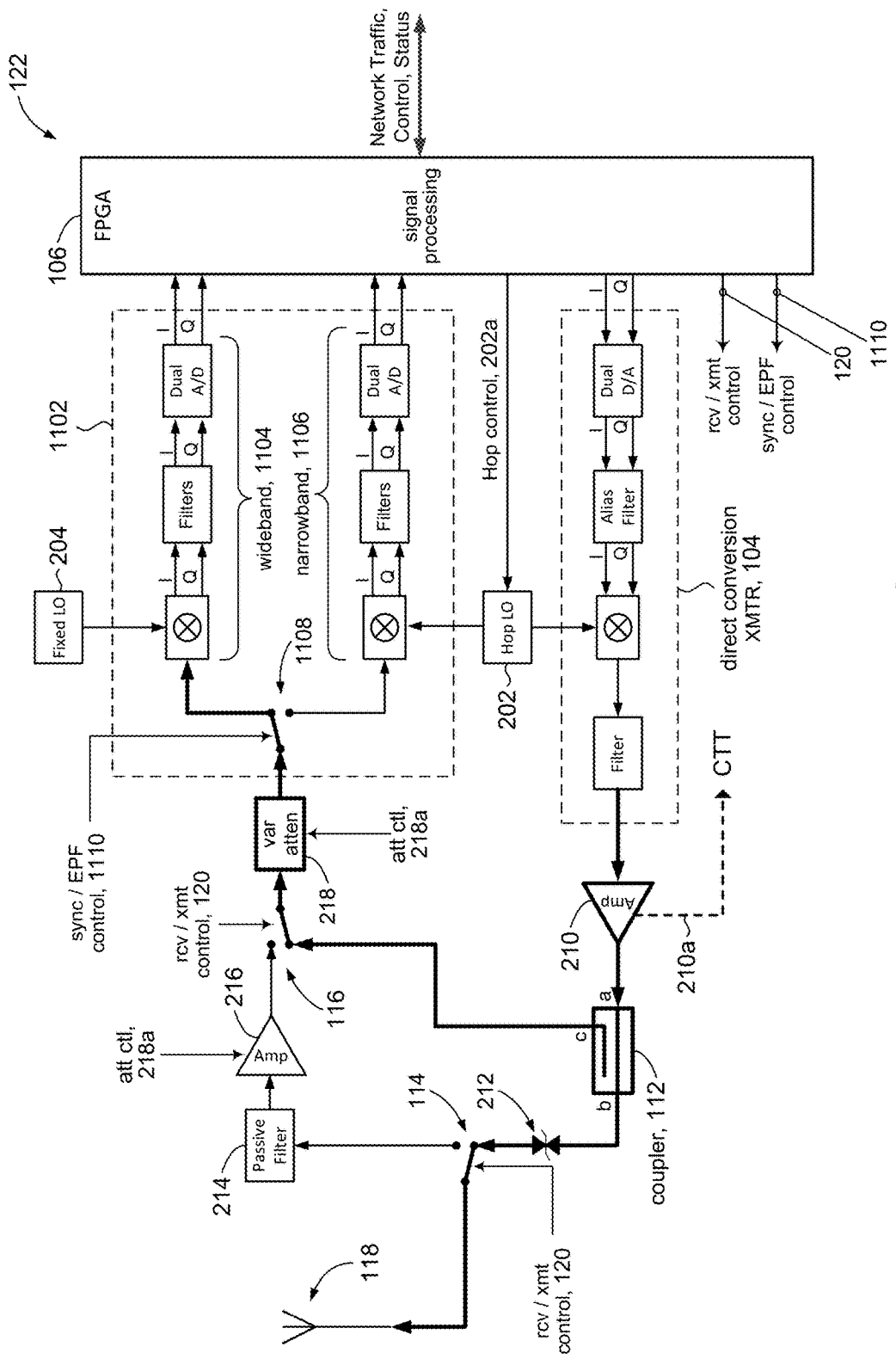
FIG. 12C illustrates a transmit mode configuration of the circuitry shown in FIG. 11.

Referring to FIG. 12C, during operation in transmit mode, the switches 114, 116, 1108 may be operated to establish a signal path between the direct conversion transmitter 104 and the antenna 118, and another signal path between the direct conversion transmitter 104 and the wideband component 1104. Processing of the transmit signal via the wideband component 1104 for compliance with the requirements for Link 16 transmissions can proceed as explained above.

It can be appreciated from the foregoing that a Link 16 terminal device in accordance with the present disclosure can provide several technical advantages. In a particular implementation, for example, advantages include:

The use of digital processing technology to process signals in the digital domain allows for significant reduction in size, and allows for integrating the EMC Features into a handheld form factor.

The health of the monitoring function can be known at all times. For example, RF PLL 1082 MHz lock status can be integrated into the EMC feature detection algorithm. The digital algorithm can track a DC offset level that is indicative of carrier LO leakage (drift in fixed LO 204), allowing the status of the monitoring function to be known at all times.

An RF envelope detector can be implemented as a digital computation of the IQ amplitude. In some embodiments, measurement accuracy of the pulse shape can be 33 ns, exceeding conventional implementations.

Pulse transmit frequency can be detected through CORDIC phase computations. A difference between the beginning and ending phases in the detection period of 5.4 μs allows very accurate estimation of the pulse transmission frequency. It has highly improved accuracy when compared to the conventional RF cycle counting method.

CTT detection threshold voltages can be generated by sigma-delta DACs that are sourced from the signal processing logic 106. For example, the Kintex 7™

FPGA includes a built-in XADC module that performs digitization of the sigma-delta DAC voltages at 1 Msps to ensure correct operation. CTT detection algorithm can be implemented in the FPGA.

The monitoring function can provide 80 dB of dynamic range and can accommodate both Link 16 transmission and power amp (e.g., 210) noise levels in the 1030 MHz and 1090 MHz notch exclusion bands. The LLD detection algorithm can be implemented using digital down conversion of 1030 MHz and 1090 MHz±7 MHz passbands and using a very sharp digital LPF to exclude actual Link 16 transmission. Technical comparisons with conventional approaches include:

Conventional LLD detection requires at least two cascaded 1030/1090 bandpass filters (80 dB or more) to reject Link 16 transmission to make it possible for a RF power detector to measure 1030/1090 IFF transmitted PA noise. To achieve high rejection, the 1030/1090 bandpass filters need to contain many poles while keeping flat response in the IFF±7 MHz passband. The size and weight of these filters are not subject to miniaturization.

Passive elements in conventional 1030/1090 bandpass filters are subject to temperature variation. The center frequency of the bandpass operation can drift, which may cause false alarms.

The monitoring function uses digital lowpass filters in place of conventional 1030/1090 passive bandpass filters. A digital lowpass filter does not have drift problems and it is reliable. The monitoring function has adequate dynamic range to accommodate both Link 16 transmission and the LLD notch noise.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method of operating a Link 16 terminal comprising:
    operating the Link 16 terminal in a receive mode, including:
        receiving a receive signal at an antenna;
        providing the receive signal to a direct conversion receiver circuit;
        performing direct conversion of the receive signal in the direct conversion receiver circuit to produce a first signal; and
        performing first processing of the first signal, including synchronizing a timing in the Link 16 terminal to the receive signal; and
    operating the Link 16 terminal in a transmit mode, including:
        generating a transmit signal in a direct conversion transmitter circuit;
        providing the transmit signal to the antenna for transmission; and
        monitoring operation of the Link 16 terminal in transmit mode for compliance with requirements for Link 16 transmissions, including:
            coupling to the transmit signal to produce a coupled transmit signal;
            providing the coupled transmit signal to the direct conversion receiver circuit;
            performing direct conversion of the coupled transmit signal in the direct conversion receiver circuit to produce a second signal; and
            performing second processing of the second signal to determine compliance of the transmit signal with at least some of the requirements for Link 16 transmissions.

2. The method of claim 1, further comprising, in receive mode, retrieving Link 16 messages contained in the receive signal.

3. The method of claim 1, further comprising inhibiting transmission of the transmit signal in response to determining that the transmit signal is non-compliant with at least one requirement for Link 16 transmissions.

4. The method of claim 1, further comprising generating one or more fault codes in response to determining that the transmit signal is non-compliant with at least one requirement for Link 16 transmissions.

5. The method of claim 1, further comprising electrically connecting the receiver circuit to the antenna when operating in receive mode and disconnecting the receiver circuit from the antenna when operating in transmit mode.

6. The method of claim 1, wherein the second processing of the second signal includes determining frequency and amplitude characteristics of the transmit signal.

7. The method of claim 1, further comprising digitizing the coupled transmit signal to produce the second signal, including:
    in a first signal path of the receiver circuit, generating an in-phase component of the coupled transmit signal and producing a digitized I signal using the in-phase component; and
    in a second signal path of the receiver circuit, generating a quadrature phase component of the coupled transmit signal and producing a digitized Q signal using the quadrature phase component,
    wherein the second signal comprises the digitized I and Q signals.

8. The method of claim 7, wherein the second processing includes delaying the digitized I signal to compensate for a phase imbalance between the digitized I and Q signals that results from independently processing the in-phase and quadrature phase components in the first and second signal paths, respectively.

9. The method of claim 1, wherein the second processing includes processing the second signal to determine pulse width and pulse power in the transmit signal, or detect an out of band condition in the transmit signal, or detect a Uniform Use of Authorized Carriers (UUAC) fault in the transmit signal.

10. The method of claim 1, wherein the second processing includes processing the second signal to measure energy in the transmit signal within ±7 MHz of 1030 MHz and within ±7 MHz of 1090 MHz.

11. A Link 16 terminal device comprising:
    a direct conversion transmitter circuit having an output for a transmit signal;
    a coupler having an input coupled to the output of the direct conversion transmitter circuit, and further having an output and a coupled port;
    a first switch having a first terminal coupled to the coupled port of the coupler, and further having a second terminal and a common terminal;

a direct conversion receiver circuit having an input coupled to the common terminal of the first switch, and further having an output;

a second switch having a first terminal coupled to the output of the coupler, a second terminal coupled to the second terminal of the first switch, and further having a common terminal;

an antenna coupled to the common terminal of the second switch;

a signal processor coupled to the output of the direct conversion receiver circuit and configured to process a signal provided to the direct conversion receiver circuit, the signal processor having a first output for Link 16 messages and a second output for fault codes representative of non-compliance of the Link 16 terminal device with one or more requirements for Link 16 transmissions; and a controller configured to set the first switch and the second switch in a first switched configuration when operating the Link 16 terminal device in a receive mode and to set the first switch and the second switch in a second switched configuration when operating the Link 16 terminal device in a transmit mode, the first switched configuration establishing a signal path, comprising the first switch and the second switch, between the antenna and the direct conversion receiver circuit to provide a signal received by the antenna to the direct conversion receiver circuit, the second switched configuration establishing a signal path, comprising the coupler and the first switch, between the direct conversion transmitter circuit and the antenna to provide the transmit signal to the antenna for transmission, and further establishing a signal path, comprising the coupler and the second switch, between the direct conversion transmitter circuit and the direct conversion receiver circuit to provide a signal that is coupled to the transmit signal by the coupler to the direct conversion receiver circuit.

12. The device of claim 11, wherein in the second switched configuration, the direct conversion receiver circuit is decoupled from the antenna.

13. The device of claim 11, wherein the signal processor inhibits transmission of the transmit signal when the signal coupled to the transmit signal and provided to the direct transmission receiver indicates that the transmit signal is non-compliant with at least one requirement for Link 16 transmissions.

14. The device of claim 11, wherein the signal processor generates one or more fault codes when the signal coupled to the transmit signal and provided to the direct transmission receiver indicates that the transmit signal is non-compliant with at least one requirement for Link 16 transmissions.

15. The device of claim 11, wherein the signal processor performs synchronization with the signal provided to the direct conversion receiver circuit when the signal is received by the antenna.

16. The device of claim 11, wherein the signal processor produces Link 16 messages when the signal provided to the direct conversion receiver circuit is the signal received by the antenna.

17. The device of claim 11, wherein the direct conversion receiver circuit includes a first circuit to produce a digitized in-phase signal from a signal provided to the direct conversion receiver circuit and a second circuit to produce a digitized quadrature-phase signal from the signal provided to the direct conversion receiver circuit, wherein the digitized in-phase signal and the digitized quadrature-phase signal are provided to the signal processor.

18. The device of claim 17, wherein, when the signal provided to the direct conversion receiver circuit is the signal coupled to the transmit signal, the signal processor delays the digitized in-phase signal to compensate for a phase imbalance between the digitized in-phase signal and the digitized quadrature-phase signal.

19. The device of claim 11, wherein the Link 16 terminal device is a hand-held device.

20. The device of claim 11, further comprising a housing to house components that comprise the Link 16 terminal device, the housing having a form factor adapted for being carried by hand.

* * * * *